US012800286B2

(12) United States Patent
Kawano

(10) Patent No.: US 12,800,286 B2
(45) Date of Patent: Nov. 17, 2026

(54) SENSOR UNIT

(71) Applicant: Murata Manufacturing Co., Ltd., Kyoto (JP)

(72) Inventor: Koji Kawano, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 370 days.

(21) Appl. No.: 18/505,507

(22) Filed: Nov. 9, 2023

(65) Prior Publication Data

US 2024/0068795 A1 Feb. 29, 2024

Related U.S. Application Data

(63) Continuation of application No. PCT/JP2022/010520, filed on Mar. 10, 2022.

(30) Foreign Application Priority Data

May 11, 2021 (JP) ................................ 2021-080402

(51) Int. Cl.
*G01B 7/16* (2006.01)
*G01L 1/16* (2006.01)

(52) U.S. Cl.
CPC . *G01B 7/16* (2013.01); *G01L 1/16* (2013.01)

(58) Field of Classification Search
CPC ............ G01B 5/0023; G01B 7/16; G01L 1/16
See application file for complete search history.

(56) References Cited

U.S. PATENT DOCUMENTS 4,763,533 A * 8/1988 Uitermarkt ............ G01L 3/108 73/862.339
5,792,000 A * 8/1998 Weber .................... A63B 71/06 473/409
11,291,885 B2 * 4/2022 Ohta .................... A61B 5/6895
12,038,274 B2 * 7/2024 Turunen .................... G01B 7/16
12,631,437 B2 * 5/2026 Iizuka ...................... G01B 7/16

(Continued)

FOREIGN PATENT DOCUMENTS

CN 112444333 A * 3/2021 .............. G01L 1/22
JP S48-35928 A 5/1973

(Continued)

OTHER PUBLICATIONS

International Search Report for PCT/JP2022/010520 dated May 24, 2022.

*Primary Examiner* — Octavia Hollington
(74) *Attorney, Agent, or Firm* — McDonald Hopkins LLC

(57) ABSTRACT

A sensor unit includes a first sensor portion that detects deformation of an object to be measured and has a film shape, a second sensor portion that detects deformation of the object to be measured and has a film shape, and a sheet to be attached to the object to be measured. A main surface of the first sensor portion and a main surface of the second sensor portion are attached to the sheet. In a state that the sheet is expanded in a plane, the main surface of the first sensor portion has a portion not overlapping the main surface of the second sensor portion, and the main surface of the second sensor portion has a portion not overlapping the main surface of the first sensor portion, in a view in a direction normal to the main surface of the sheet.

20 Claims, 15 Drawing Sheets

(56) References Cited

U.S. PATENT DOCUMENTS

| | | | | |
|---|---|---|---|---|
| 2009/0233729 | A1* | 9/2009 | Chiang | A63B 53/00 473/289 |
| 2009/0247312 | A1* | 10/2009 | Sato | A63B 69/3632 473/223 |
| 2021/0213327 | A1 | 7/2021 | Ohta et al. | |
| 2024/0068796 | A1* | 2/2024 | Iizuka | G01L 1/16 |
| 2024/0091620 | A1* | 3/2024 | Iizuka | G09B 19/0038 |
| 2024/0142216 | A1* | 5/2024 | Makino | G01L 1/16 |
| 2024/0143284 | A1* | 5/2024 | Makino | G06F 7/76 |

FOREIGN PATENT DOCUMENTS

| | | | | |
|---|---|---|---|---|
| JP | H10-244023 | A | 9/1998 | |
| JP | 2006-255303 | A | 9/2006 | |
| JP | 4037256 | B2 | 1/2008 | |
| JP | 6342034 | B1 | 6/2018 | |
| SU | 1499106 | A1 * | 8/1989 | |
| WO | WO-2014045854 | A1 * | 3/2014 | A63B 53/00 |

* cited by examiner

SENSOR UNIT

CROSS REFERENCE TO RELATED APPLICATION

This is a continuation of International Application No. PCT/JP2022/010520 filed on Mar. 10, 2022 which claims priority from Japanese Patent Application No. 2021-080402 filed on May 11, 2021. The contents of these applications are incorporated herein by reference in their entireties.

BACKGROUND OF THE DISCLOSURE

Field of the Disclosure

The present disclosure relates to a sensor unit for detecting deformation of an object to be measured.

Description of the Related Art

As a disclosure concerning a sensor unit in the related art, a swing analysis device, a swing analysis method, and a swing analysis system described in Patent Document 1 are known, for example. A swing analysis device described in Patent Document 1 includes an information input unit that receives acceleration information, angular velocity information, and distortion information of a golf club shaft detected by a sensor attached to the golf club shaft, a posture calculation unit that calculates posture information of the golf club in a swing period, based on the acceleration information and the angular velocity information, a correction unit that corrects the posture information of the golf club at the time of impact, based on the distortion information of the golf club shaft, and a display control unit that causes a display to display the posture information of the golf club corrected by the correction unit. With the use of the swing analysis device described above, swing of a golf club may be analyzed.

Patent Document 1: Japanese Patent No. 6342034

BRIEF SUMMARY OF THE DISCLOSURE

In the swing analysis device described in Patent Document 1, there is a demand for improving positioning accuracy of the sensor.

A possible benefit of the present disclosure is to provide a sensor unit having high positioning accuracy of a plurality of sensor portions.

A sensor unit according to an embodiment of the present disclosure is a sensor unit for detecting deformation of an object to be measured. The sensor unit includes a first sensor portion configured to detect deformation of the object to be measured and having a film shape, a second sensor portion configured to detect deformation of the object to be measured and having a film shape, and a sheet attached to the object to be measured. A main surface of the first sensor portion and a main surface of the second sensor portion are attached to the sheet. In a state that the sheet is expanded in a plane, the main surface of the first sensor portion has a portion not overlapping the main surface of the second sensor portion in a view in a direction normal to the main surface of the sheet. In the state that the sheet is expanded in a plane, the main surface of the second sensor portion has a portion not overlapping the main surface of the first sensor portion in a view in the direction normal to the main surface of the sheet.

In the configuration above, in the state that the sheet is expanded in a plane, the first sensor portion having the film shape and the second sensor portion having the film shape are positioned on the sheet. Further, when the sheet is attached to the object to be measured, the sheet is positioned on the object to be measured. Thus, when the sensor unit is attached to the object to be measured having a three dimensional shape, neither positioning of the first sensor portion nor positioning of the second sensor portion is required. Therefore, the positioning of the first sensor portion and the positioning of the second sensor portion may easily and accurately be performed.

In the present description, an axis or a member extending in a first direction does not necessarily include only an axis or a member parallel to the first direction. The axis or the member extending in the first direction is an axis or a member inclined in a range of ±45 degrees relative to the first direction. Similarly, an axis or a member extending in a front-back direction is an axis or a member inclined in a range of ±45 degrees relative to the front-back direction. An axis or a member extending in a left-right direction is an axis or a member inclined in a range of ±45 degrees relative to the left-right direction. An axis or a member extending in an up-down direction is an axis or a member inclined in a range of ±45 degrees relative to the up-down direction.

In the present description, directions are defined as follows. In golf clubs 20 and 20*a* to 20*f*, respective shafts 21 and 21*a* to 21*f* being the object to be measured have a shape of a cylinder, and a center axis direction of the cylinder is defined as the first direction. A rotating direction about the first direction is defined as a circumferential direction. A direction orthogonal to the first direction is defined as a second direction. A direction orthogonal to the first direction and the second direction is defined as a third direction. In a state that sheets 11 and 11*a* to 11*e* and sensor units 10 and 10*a* to 10*f* are expanded in a plane, a direction normal to a main surface of each of the sheets 11 and 11*a* to 11*e* and the sensor units 10 and 10*a* to 10*f* is defined as a front-back direction. In the state that the sheet 11 and 11*a* to 11*e* and the sensor units 10 and 10*a* to 10*f* are expanded in a plane, a direction in which first sensor portions 12 and 12*a* to 12*f* and second sensor portions 13 and 13*a* to 13*f* are arranged side by side, respectively, is defined as a left-right direction in a view in the front-back direction. A direction orthogonal to the front-back direction and the left-right direction is defined as an up-down direction.

In the present description, unless otherwise specified, each portion of a first member is defined as follows. A front portion of the first member means a front half of the first member. A back portion of the first member means a back half of the first member. A left portion of the first member means a left half of the first member. A right portion of the first member means a right half of the first member. An upper portion of the first member means an upper half of the first member. A lower portion of the first member means a lower half of the first member.

According to the present disclosure, a sensor unit having high positioning accuracy may be obtained.

DETAILED DESCRIPTION OF THE DISCLOSURE

First Embodiment

Figure 1:
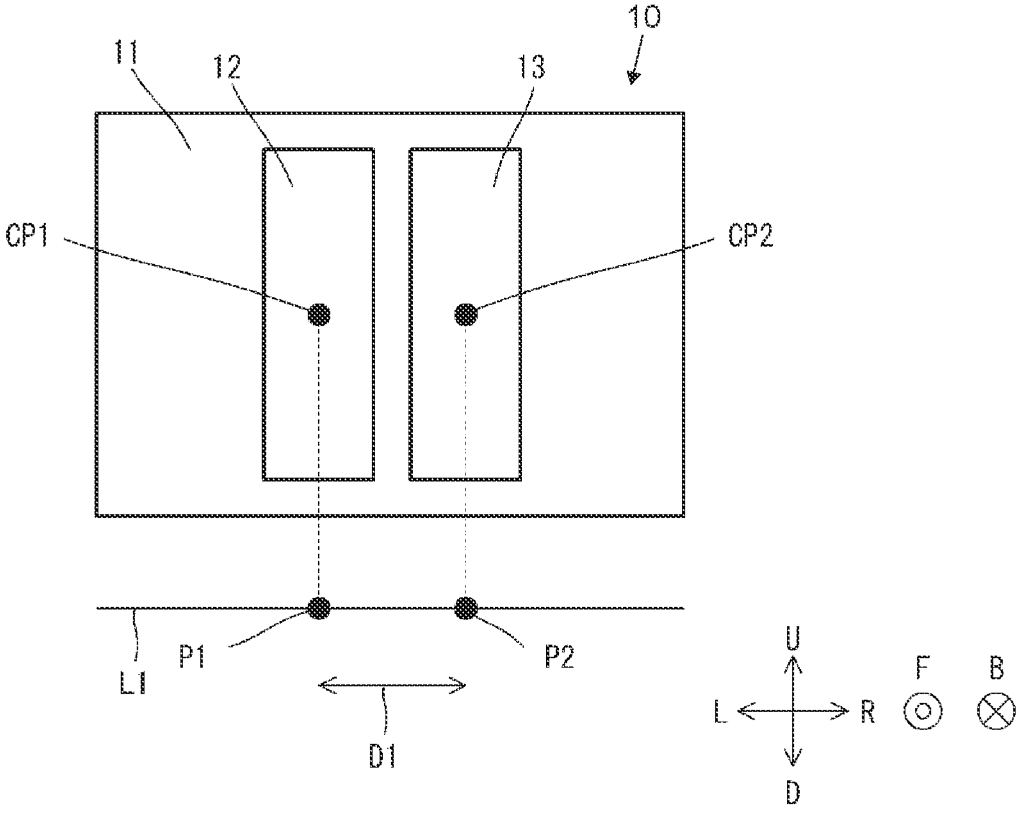
FIG. 1 is a plan view of a sensor unit 10 in a state that a sheet 11 according to a first embodiment is expanded in a plane.
Figure 2:
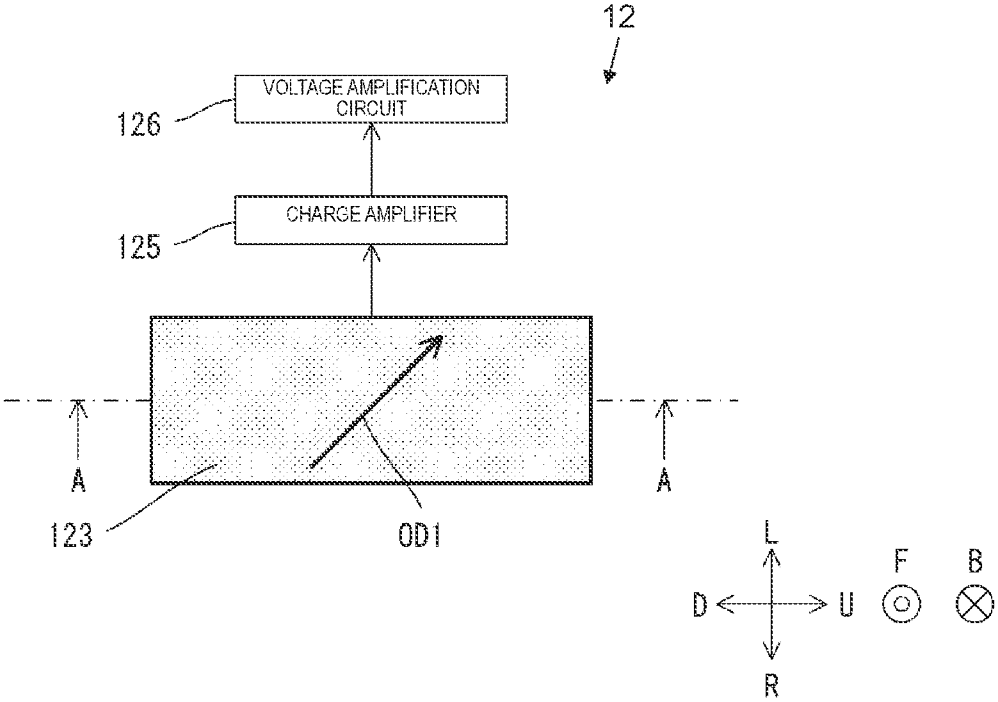
FIG. 2 is a plan view and a sectional view of a first sensor portion 12 in the state that the sheet 11 according to the first embodiment is expanded in a plane.
Figure 2:
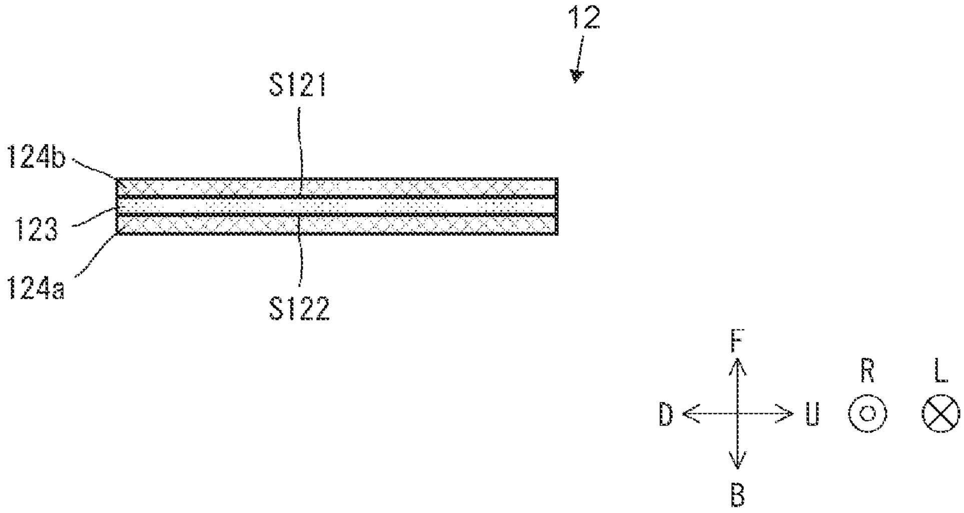
Figure 3:
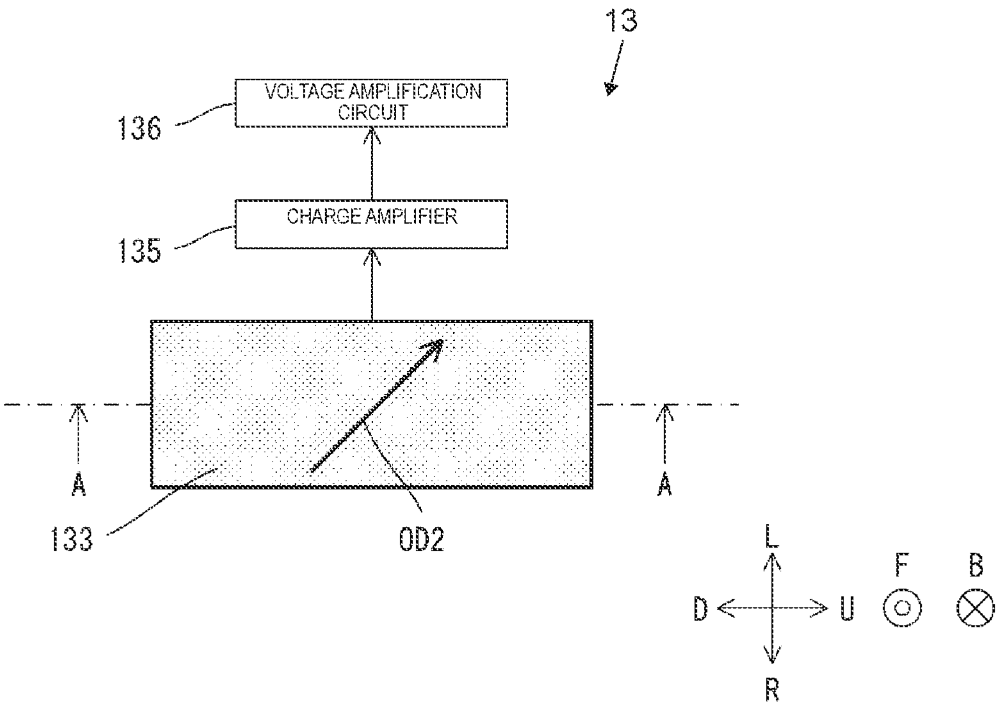
FIG. 3 is a plan view and a sectional view of a second sensor portion 13 in the state that the sheet 11 according to the first embodiment is expanded in a plane.
Figure 3:
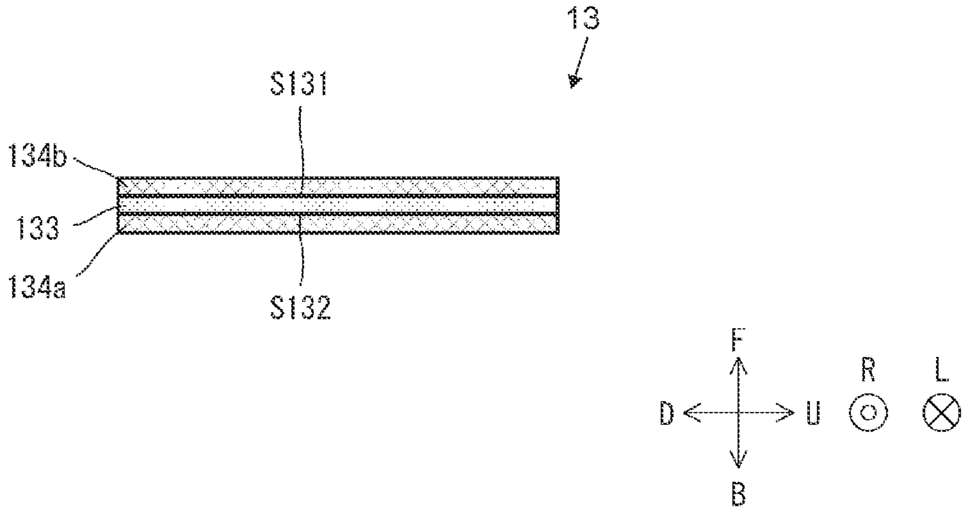
Figure 4:
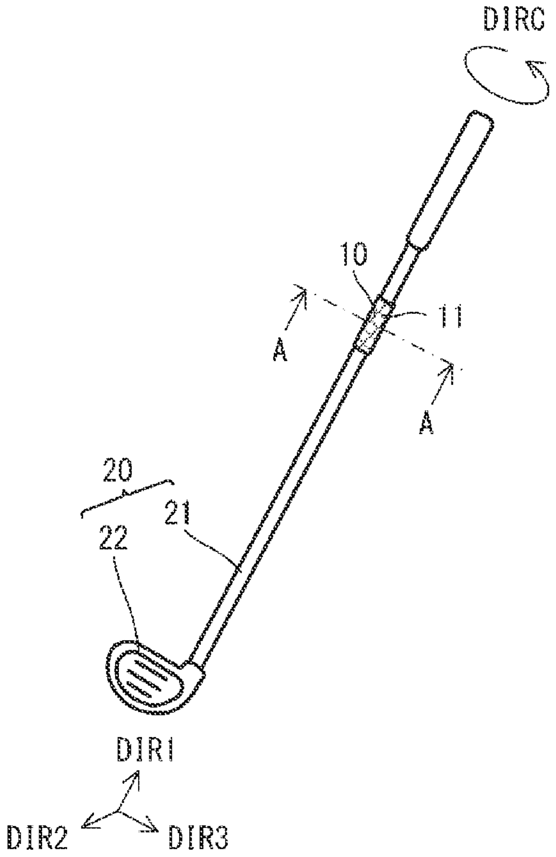
FIG. 4 is a perspective view of the sensor unit 10 according to the first embodiment in a state of being attached to a shaft 21.
Figure 5:
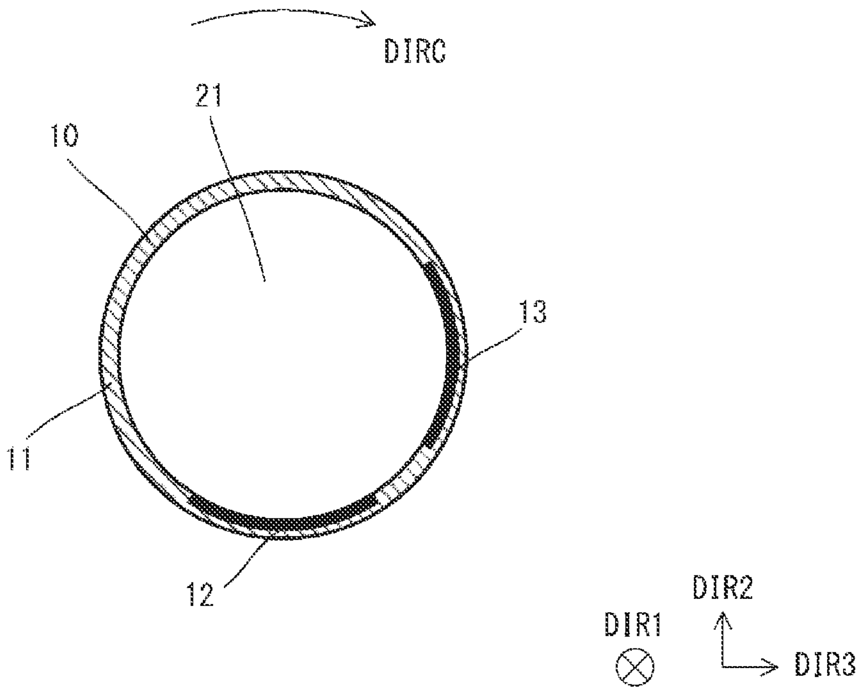
FIG. 5 is a sectional view of the sensor unit 10 according to the first embodiment in the state of being attached to the shaft 21 taken along a line A-A.

Hereinafter, a sensor unit according to a first embodiment of the present disclosure will be described with reference to the accompanying drawings. FIG. 1 is a plan view of a sensor unit 10 in a state that a sheet 11 according to the first embodiment is expanded in a plane. FIG. 2 is a plan view and a sectional view of a first sensor portion 12 in the state that the sheet 11 according to the first embodiment is expanded in a plane. FIG. 3 is a plan view and a sectional view of a second sensor portion 13 in the state that the sheet 11 according to the first embodiment is expanded in a plane. FIG. 4 is a perspective view of the sensor unit 10 according to the first embodiment in a state of being attached to a shaft 21. FIG. 5 is a sectional view of the sensor unit 10 according to the first embodiment in the state of being attached to the shaft 21 taken along a line A-A.

The sensor unit 10 is a sensor unit that detects deformation of the shaft 21 described later. As illustrated in FIG. 1, the sensor unit 10 includes the sheet 11, the first sensor portion 12, and the second sensor portion 13. The sheet 11 is a sheet to be attached to the shaft 21 described later. The sheet 11 has a front main surface and a back main surface. The front main surface and the back main surface of the sheet 11 each have a rectangular shape. A front main surface of the sheet 11 has a rectangular shape having a left short side and a right short side that are extending in the up-down direction, and an upper long side and a lower long side that are extending in the left-right direction. The back main surface of the sheet 11 has a left short side and a right short side that are extending in the up-down direction, and an upper long and a lower long side that are extending in the left-right direction. In the state that the sheet 11 is expanded in a plane, a length of each of the upper long side and the lower long side of the front main surface of the sheet 11, and a length of each of the upper long side and the lower long side of the back main surface of the sheet 11 each are equal to or greater than a circumferential length of a sectional circle of the shaft 21 described later. An adhesive layer (not illustrated) is provided on the front main surface of the sheet 11. The adhesive layer has an insulation property.

The first sensor portion 12 detects deformation of the shaft 21 described later, and has a film shape. The first sensor portion 12 has a front main surface and a back main surface. As illustrated in FIG. 2, the first sensor portion 12 includes a piezoelectric film 123, a first electrode 124*a*, a second electrode 124*b*, a charge amplifier 125, and a voltage amplification circuit 126. The piezoelectric film 123 is an example of a piezoelectric body. The piezoelectric film 123 has a sheet shape. The piezoelectric film 123 (first piezoelectric body) has a front main surface S121 and a back main surface S122. In the state that the sheet 11 is expanded in a plane, the front main surface S121 and the back main surface S122 of the piezoelectric film 123 (first piezoelectric body) each have a rectangular shape having long sides extending in the up-down direction and short sides extending in the left-right direction in a view in the front-back direction. In the present embodiment, a longitudinal direction of the piezoelectric film 123 (first piezoelectric body) of the first sensor portion 12 is the up-down direction, and a lateral direction of the piezoelectric film 123 (first piezoelectric body) of the first sensor portion 12 is the left-right direction. In the present embodiment, the piezoelectric film 123 is a PLA film.

The second sensor portion 13 detects deformation of the shaft 21 described later, and has a film shape. Note that, a deformation direction detected by the first sensor portion 12 and a deformation direction detected by the second sensor portion 13, of the shaft 21 described later, are different from each other. The second sensor portion 13 has a front main surface and a back main surface. As illustrated in FIG. 3, the second sensor portion 13 includes a piezoelectric film 133, a first electrode 134*a*, a second electrode 134*b*, a charge amplifier 135, and a voltage amplification circuit 136. The piezoelectric film 133 is an example of a piezoelectric body. The piezoelectric film 133 has a sheet shape. The piezoelectric film 133 (second piezoelectric body) has a front main surface S131 and a back main surface S132. In the state that the sheet 11 is expanded in a plane, the front main surface S131 and the back main surface S132 of the piezoelectric film 133 (second piezoelectric body) each have a rectangular shape having long sides extending in the up-down direction and short sides extending in the left-right direction in a view in the front-back direction. In the present embodiment, a longitudinal direction of the piezoelectric film 133 (second piezoelectric body) of the second sensor portion 13 is the up-down direction, and a lateral direction of the piezoelectric film 133 (second piezoelectric body) of the second sensor portion 13 is the left-right direction. In the present embodiment, the piezoelectric film 133 is a PLA film. Hereinafter, the piezoelectric film 123 and the piezoelectric film 133 will be described in more detail.

Each of the piezoelectric film 123 and the piezoelectric film 133 generates electric charge corresponding to a differential value of deformation amount of each of the piezoelectric film 123 and the piezoelectric film 133. Each of the piezoelectric film 123 and the piezoelectric film 133 has a characteristic in which polarity of electric charge generated at a time being extended in the up-down direction is opposite to polarity of electric charge generated at a time being extended in the left-right direction. Specifically, each of the piezoelectric film 123 and the piezoelectric film 133 is a film formed of a chiral polymer. The chiral polymer is polylactic acid (PLA), particularly L-type polylactic acid (PLLA), for example. PLLA composed of a chiral polymer has a main chain having a helical structure. PLLA has a piezoelectric property in which molecules are oriented by being uniaxially extended. Each of the piezoelectric film 123 and the piezoelectric film 133 has a d14 piezoelectric constant. A uniaxial extension axis OD1 of the piezoelectric film 123 (first piezoelectric body) forms an angle of 45 degrees counterclockwise relative to the up-down direction, and a uniaxial extension axis OD2 of the piezoelectric film 133 (second piezoelectric body) forms an angle of −45 degrees counterclockwise relative to the left-right direction. That is, each of the piezoelectric film 123 (first piezoelectric body) and the piezoelectric film 133 (second piezoelectric body) is extended in at least one axial direction. The angle of −45 degrees includes an angle of −45 degrees plus or minus approximately 10 degrees, for example. With this, each of the piezoelectric film 123 and the piezoelectric film 133 generates electric charge when deformed to be extended or to be compressed in the up-down direction. Each of the piezoelectric film 123 and the piezoelectric film 133 generates positive electric charge when deformed to be extended in the up-down direction, for example. Each of the piezoelectric film 123 and the piezoelectric film 133 generates negative electric charge when deformed to be compressed in the up-down direction, for example. Magnitude of the electric charge depends on a differential value of deformation amount of each of the piezoelectric film 123 and the piezoelectric film 133 caused by extension or compression.

The first electrode 124*a* is a signal electrode. As illustrated in FIG. 2, the first electrode 124*a* is provided on the back main surface S122. The first electrode 124*a* covers the back main surface S122. The first electrode 124*a* is an organic electrode such as indium tin oxide (ITO) or zinc oxide (ZnO), a metal coat formed by vapor deposition or plating, or a printed electrode film formed by silver paste, for example.

The second electrode 124*b* is a ground electrode. The second electrode 124*b* is coupled to a ground electric potential. As illustrated in FIG. 2, the second electrode 124*b* is provided on the front main surface S121. Thus, the piezoelectric film 123 is positioned between the first electrode 124*a* and the second electrode 124*b*. The second electrode 124*b* covers the front main surface S121. The second electrode 124*b* is an organic electrode such as indium tin oxide (ITO) and zinc oxide (ZnO), a metal coat formed by vapor deposition or plating, or a printed electrode film formed by silver paste, for example.

The charge amplifier 125 converts electric charge generated by the piezoelectric film 123 into a detection signal, being a voltage signal, and outputs the detection signal to the voltage amplification circuit 126. The voltage amplification circuit 126 amplifies and outputs the detection signal.

The first sensor portion 12 described above is attached to the sheet 11 via an adhesive layer (not illustrated). In more detail, the adhesive layer has an insulation property. Specifically, the adhesive layer fixes the first electrode 124*a* and the front main surface of the sheet 11. That is, a back main surface of the first sensor portion 12 is fixed to the front main surface of the sheet 11.

The first electrode 134*a* is a signal electrode. As illustrated in FIG. 3, the first electrode 134*a* is provided on the back main surface S132. The first electrode 134*a* covers the back main surface S132. The first electrode 134*a* is an organic electrode such as indium tin oxide (ITO) and zinc oxide (ZnO), a metal coat formed by vapor deposition or plating, or a printed electrode film formed by silver paste, for example.

The second electrode 134*b* is a ground electrode. The second electrode 134*b* is coupled to the ground electric potential. As illustrated in FIG. 3, the second electrode 134*b* is provided on the front main surface S131. Thus, the piezoelectric film 133 is positioned between the first electrode 134*a* and the second electrode 134*b*. The second electrode 134*b* covers the front main surface S131. The second electrode 134*b* is an organic electrode such as indium tin oxide (ITO) and zinc oxide (ZnO), a metal coat formed by vapor deposition or plating, or a printed electrode film formed by silver paste, for example.

The charge amplifier 135 converts electric charge generated by the piezoelectric film 133 into a detection signal, being a voltage signal, and outputs the detection signal to the voltage amplification circuit 136. The voltage amplification circuit 136 amplifies and outputs the detection signal.

The second sensor portion 13 described above is attached to the sheet 11 via an adhesive layer (not illustrated). In more detail, the adhesive layer has an insulation property. Specifically, the adhesive layer fixes the first electrode 134*a* and the front main surface of the sheet 11. That is, a back main surface of the second sensor portion 13 is fixed to the front main surface of the sheet 11.

As illustrated in FIG. 1, in the state that the sheet 11 is expanded in a plane, a front main surface of the first sensor portion 12 is disposed at a position not overlapping a front main surface of the second sensor portion 13 in a view in the front-back direction. That is, in the state that the sheet 11 is expanded in a plane, the front main surface of the first sensor portion 12 has a portion not overlapping the front main surface of the second sensor portion 13 in a view in the front-back direction. The second sensor portion 13 is positioned to the right of the first sensor portion 12. In the state that the sheet 11 is expanded in a plane, the front main surface of the second sensor portion 13 is disposed at a position not overlapping the front main surface of the first sensor portion 12 in a view in the front-back direction. That is, in the state that the sheet 11 is expanded in a plane, the front main surface of the second sensor portion 13 has a portion not overlapping the front main surface of the first sensor portion 12 in a view in the front-back direction.

As illustrated in FIG. 1, in the state that the sheet 11 is expanded in a plane, the left short side and the right short side of the front main surface of the sheet 11, each of long sides of the first sensor portion 12, and each of long sides of the second sensor portion 13 are parallel to each other. Further, in the state that the sheet 11 is expanded in a plane, the upper long side and the lower long side of the front main surface of the sheet 11, each of short sides of the first sensor portion 12, and each of short sides of the second sensor portion 13 are parallel to each other.

As illustrated in FIG. 1, in the state that the sheet 11 is expanded in a plane, a first center point CP1 of the first sensor portion 12 is defined in a view in the front-back direction. The first center point CP1 is a center of gravity of the front main surface of the first sensor portion 12, for example. The first center point CP1 may be a center of gravity of the back main surface of the first sensor portion 12, for example. The first center point CP1 may be a center of the front main surface of the first sensor portion 12, for example. At this time, when two diagonal lines are defined on the front main surface of the first sensor portion 12, for example, the two diagonal lines intersect with each other at the first center point CP1. When a straight line connecting midpoints of the two short sides and a straight line connecting midpoints of the two long sides are defined on the front main surface of the first sensor portion 12, for example, the straight line connecting the midpoints of the two short sides and the straight line connecting the midpoints of the two long sides intersect with each other at the first center point CP1. The first center point CP1 may be a center of the back main surface of the first sensor portion 12, for example. At this time, when two diagonal lines are defined on the back main surface of the first sensor portion 12, for example, the two diagonal lines intersect with each other at the first center point CP1. When a straight line connecting midpoints of the two short sides and a straight line connecting midpoints of the two long sides are defined on the back main surface of the first sensor portion 12, for example, the straight line connecting the midpoints of the two short sides and the straight line connecting the midpoints of the two long sides intersect with each other at the first center point CP1.

Similarly, in the state that the sheet 11 is expanded in a plane, a second center point CP2 of the second sensor portion 13 is defined in a view in the front-back direction. The second center point CP2 is a center of gravity of the front main surface of the second sensor portion 13, for example. The second center point CP2 may be a center of gravity of the back main surface of the second sensor portion 13, for example. The second center point CP2 may be a center of the front main surface of the second sensor portion 13, for example. At this time, when two diagonal lines are defined on the front main surface of the second sensor portion 13, for example, the two diagonal lines intersect with each other at the second center point CP2. When a straight line connecting midpoints of the two short sides and a straight line connecting midpoints of the two long sides are defined on the front main surface of the second sensor portion 13, for example, the straight line connecting the midpoints of the two short sides and the straight line connecting the midpoints of the two long sides intersect with each other at the second center point CP2. The second center point CP2 may be a center of the back main surface of the second sensor portion 13, for example. At this time, when two diagonal lines are defined on the back main surface of the second sensor portion 13, for example, the two diagonal lines intersect with each other at the second center point CP2. When a straight line connecting midpoints of the two short sides and a straight line connecting midpoints of the two long sides are defined on the back main surface of the second sensor portion 13, for example, the straight line connecting the midpoints of the two short sides and the straight line connecting the midpoints of the two long sides intersect with each other at the second center point CP2.

As illustrated in FIG. 1, in the state that the sheet 11 is expanded in a plane, there is defined any straight line Li extending in the left-right direction in a view in the front-back direction. In the state that the sheet 11 is expanded in a plane, an intersection point of the straight line Li and a perpendicular line drawn from the first center point CP1 to the straight line Li, in a view in the front-back direction, is defined as a first intersection point P1. Further, an intersection point of the straight line Li and a perpendicular line drawn from the second center point CP2 to the straight line Li, in a view in the front-back direction, is defined as a second intersection point P2. A distance between the first intersection point P1 and the second intersection point P2 is defined as a first distance D1. In the state that the sheet 11 is expanded in a plane, the first distance D1 of the present embodiment is equal to one-fourth of a circumferential length of the sectional circle of the shaft 21 described later.

As illustrated in FIG. 4, a golf club 20 has the shaft 21 and a head 22. The shaft 21 has a shape of a cylinder. A center axis direction of the cylinder is the same direction as a first direction DIR1. That is, the shaft 21 extends in the first direction DIR1. A section of the shaft 21 perpendicular to the first direction DIR1 has a shape of a circle. The circumferential direction of the sectional circle of the shaft 21 is the same direction as a circumferential direction DIRC. The shaft 21 has a first end and a second end in the first direction DIR1. The head 22 is provided at the first end of the shaft 21. A grip is provided near the second end of the shaft 21. In the present embodiment, an object to be measured is the shaft 21.

The sensor unit 10 is attached to the circumferential surface of the shaft 21. Specifically, the front main surface of the sheet 11 is fixed to the shaft 21 by an adhesive layer (not illustrated) provided on the front main surface of the sheet 11. The first sensor portion 12 is fixed to the shaft 21 by an adhesive layer (not illustrated) provided on the front main surface of the first sensor portion 12. The second sensor portion 13 is fixed to the shaft 21 by an adhesive layer (not illustrated) provided on the front main surface of the second sensor portion 13. In the example of FIG. 4, the sensor unit 10 is attached near the grip of the shaft 21, but an attachment position of the sensor unit 10 to the shaft 21 is not limited thereto. In a state that the sensor unit 10 is attached to the shaft 21, the upper long side and the lower long side of the front main surface of the sheet 11 each extend in the same direction as the circumferential direction DIRC.

As illustrated in FIG. 5, in the state that the sensor unit 10 is attached to the shaft 21, the first sensor portion 12 and the second sensor portion 13 are disposed between the shaft 21 and the sheet 11. The first sensor portion 12 detects deformation of the shaft 21 in a second direction DIR2. The second sensor portion 13 detects deformation of the shaft 21 in a third direction DIR3. As described above, the upper long side and the lower long side of the front main surface of the sheet 11 each extend in the same direction as the circumferential direction DIRC. Thus, the first distance D1 is equal to a distance between the first center point CP1 of the first sensor portion 12 and the second center point CP2 of the second sensor portion 13 in the circumferential direction DIRC. Further, as described above, in the state that the sheet 11 is expanded in a plane, the first distance D1 is equal to one-fourth of the circumferential length of the sectional circle of the shaft 21. Thus, the first center point CP1 of the first sensor portion 12 and the second center point CP2 of the second sensor portion 13 are disposed to be separated from each other by 90 degrees in the circumferential direction DIRC of the shaft 21.

Effects

With the use of the sensor unit 10, the first sensor portion 12 and the second sensor portion 13 may accurately be positioned. In particular, it is suitable for a case that the first sensor portion 12 and the second sensor portion 13 are attached to a curved surface of an object to be measured. In more detail, in the state that the sheet 11 is expanded in a plane, the front main surface of the first sensor portion 12 has a portion not overlapping the front main surface of the second sensor portion 13 in a view in a direction normal to the front main surface of the sheet 11. Further, in the state that the sheet 11 is expanded in a plane, the front main surface of the first sensor portion 12 is disposed at a position not overlapping the front main surface of the second sensor portion 13 in a view in the direction normal to the front main surface of the sheet 11. In the state that the sheet 11 is expanded in a plane, the front main surface of the second sensor portion 13 has a portion not overlapping the front main surface of the first sensor portion 12 in a view in the direction normal to the front main surface of the sheet 11. Further, in the state that the sheet 11 is expanded in a plane, the front main surface of the second sensor portion 13 is disposed at a position not overlapping the front main surface of the first sensor portion 12 in a view in the direction normal to the front main surface of the sheet 11. In the sensor unit 10 described above, a position of the first sensor portion 12 and a position of the second sensor portion 13 are different from each other. Thus, it is necessary to position the first sensor portion 12 on the shaft 21, and to position the second sensor portion 13 on the shaft 21 as well.

Meanwhile, in the sensor unit 10, the back main surface of the first sensor portion 12 and the back main surface of the second sensor portion 13 each are attached to the sheet 11. With this, in the state that the sheet 11 is expanded in a plane, the first sensor portion 12 and the second sensor portion 13 each may be positioned on the sheet 11. Accordingly, positioning the sheet 11 on the shaft 21 makes it possible to position the first sensor portion 12 and the second sensor portion 13 on the shaft 21 at the same time. Thus, the first sensor portion 12 and the second sensor portion 13 may accurately be positioned.

With the use of the sensor unit 10, in the state that the sheet 11 is expanded in a plane, the long side of the main surface of the first sensor portion 12 is parallel to the long side of the main surface of the second sensor portion 13. As a result, the first sensor portion 12 and the second sensor portion 13 may accurately be positioned.

Note that the sheet 11 may have an insulation property or may have electric conductivity.

In the state that the sheet 11 is expanded in a plane, each of the uniaxial extension axis OD1 of the piezoelectric film 123 (first piezoelectric body) and the uniaxial extension axis OD2 of the piezoelectric film 133 (second piezoelectric body) is not limited to have an angle of 45 degrees counterclockwise relative to the up-down direction, and may have another angle.

For example, in the state that the sheet 11 is expanded in a plane, each of the uniaxial extension axis OD1 of the piezoelectric film 123 (first piezoelectric body) and the uniaxial extension axis OD2 of the piezoelectric film 133 (second piezoelectric body) may form an angle of 45 degrees clockwise relative to the up-down direction. Note that the angle of 45 degrees includes an angle of 45 degrees plus or minus approximately 10 degrees, for example. In the configuration above, the piezoelectric film 123 generates positive electric charge when the first sensor portion 12 is deformed to be extended in the left-right direction, and generates negative electric charge when the first sensor portion 12 is deformed to be compressed in the left-right direction. The piezoelectric film 133 generates positive electric charge when the second sensor portion 13 is deformed to be extended in the left-right direction, and generates negative electric charge when the second sensor portion 13 is deformed to be compressed in the left-right direction.

For example, in the state that the sheet 11 is expanded in a plane, each of the uniaxial extension axis OD1 of the piezoelectric film 123 (first piezoelectric body) and the uniaxial extension axis OD2 of the piezoelectric film 133 (second piezoelectric body) may form an angle of 0 degrees counterclockwise or 180 degrees counterclockwise relative to the up-down direction. Note that the angle of 0 degrees or the angle of 180 degrees includes an angle of 0 degrees plus or minus approximately 10 degrees or an angle of 180 degrees plus or minus approximately 10 degrees, for example. In the configuration above, it is possible to make a direction, in which the piezoelectric property of the piezoelectric film 123 (first piezoelectric body) is the highest, coincide with a direction of torsion relative to the up-down direction and the left-right direction. Further, it is possible to make a direction, in which the piezoelectric property of the piezoelectric film 133 (second piezoelectric body) is the highest, coincide with a direction of torsion relative to the up-down direction and the left-right direction.

For example, in the state that the sheet 11 is expanded in a plane, each of the uniaxial extension axis OD1 of the piezoelectric film 123 (first piezoelectric body) and the uniaxial extension axis OD2 of the piezoelectric film 133 (second piezoelectric body) may form an angle of 90 degrees counterclockwise or −90 degrees counterclockwise relative to the up-down direction. Note that the angle of 90 degrees or the angle of −90 degrees includes an angle of 90 degrees plus or minus approximately 10 degrees or an angle of −90 degrees plus or minus approximately 10 degrees, for example. In the configuration above, it is possible to make a direction, in which the piezoelectric property of the piezoelectric film 123 (first piezoelectric body) is the highest, coincide with a direction of torsion relative to the up-down direction and the left-right direction. Further, it is possible to make a direction, in which the piezoelectric property of the piezoelectric film 133 (second piezoelectric body) is the highest, coincide with a direction of torsion relative to the up-down direction and the left-right direction.

In the present embodiment, in the sensor unit 10, each of the first sensor portion 12 and the second sensor portion 13 includes a film having PLA and extended in at least one axial direction. From a viewpoint of detecting deformation of an object to be measured, however, each of the first sensor portion 12 and the second sensor portion 13 may include a material having another piezoelectric body. Each of the first sensor portion 12 and the second sensor portion 13 may include a material having no piezoelectric property.

For example, each of the first sensor portion 12 and the second sensor portion 13 may have a d31 piezoelectric constant. Each of the first sensor portion 12 and the second sensor portion 13 having the d31 piezoelectric constant is a polyvinylidene fluoride (PVDF) film, for example.

The deformation detection of an object to be measured may be the detection of deformation amount itself.

For example, each of the first sensor portion 12 and the second sensor portion 13 may include a strain gauge.

The deformation detection of an object to be measured may be flexure detection of an object to be measured or torsion detection of an object to be measured.

The first electrode 124*a* may be provided on the front main surface S121. The second electrode 124*b* may be provided on the back main surface S122. The first electrode 134*a* may be provided on the front main surface S131. The second electrode 134*b* may be provided on the back main surface S132.

In the state that the sheet 11 is expanded in a plane, each of the front main surface and the back main surface of the first sensor portion 12 may have a rectangular shape having short sides extending in the up-down direction and long sides extending in the left-right direction in a view in the front-back direction. In the state that the sheet 11 is expanded in a plane, each of the front main surface and the back main surface of the second sensor portion 13 may have a rectangular shape having short sides extending in the up-down direction and long sides extending in the left-right direction in a view in the front-back direction.

Note that, in the state that the sheet 11 is expanded in a plane, the length of each of the upper long side and the lower long side of the front main surface of the sheet 11, and the length of each of the upper long side and the lower long side of the back main surface of the sheet 11 each may be longer than the circumferential length of the sectional circle of the shaft 21. In the state that the sensor unit 10 is attached to the shaft 21, the number of intersections of any straight line orthogonal to the first direction DIR1 and the front main surface of the sheet 11 may be three or more in a view in the first direction DIR1.

Note that, in the state that the sheet 11 is expanded in a plane, the length of each of the upper long side and the lower long side of the front main surface of the sheet 11, and the length of each of the upper long side and the lower long side of the back main surface of the sheet 11 each may be equal to the circumferential length of the sectional circle of the shaft 21.

Note that each of the front main surface and the back main surface of the sheet 11 need not have a rectangular shape. The rectangular shape includes a rectangle and a slightly deformed rectangle shape. The slightly deformed rectangle shape is a rectangle shape having rounded corners, for example. The shape of the front main surface and the back main surface of the sheet 11 may be a shape completely different from a rectangular shape.

The sheet 11 may have a uniform or non-uniform thickness (distance between the front main surface and the back main surface of the sheet 11).

In the state that the sheet 11 is expanded in a plane, the first distance D1 need not be equal to one-fourth of the circumferential length of the sectional circle of the shaft 21. For example, in the state that the sheet 11 is expanded in a plane, in a case that the first distance D1 is equal to one-sixth of the circumferential length of the sectional circle of the shaft 21, the first center point CP1 of the first sensor portion 12 and the second center point CP2 of the second sensor portion 13 are disposed to be separated from each other by 60 degrees in the circumferential direction DIRC of the shaft 21 in the state that the sensor unit 10 is attached to the shaft 21.

In the state that the sheet 11 is expanded in a plane, each of the front main surface and the back main surface of the first sensor portion 12 need not have a rectangular shape. Further, in the state that the sheet 11 is expanded in a plane, each of the front main surface and the back main surface of the second sensor portion 13 need not have a rectangular shape.

For example, in the state that the sheet 11 is expanded in a plane, each of the front main surface and the back main surface of the first sensor portion 12 may have an elliptical shape. In the case above, in the state that the sheet 11 is expanded in a plane, a long axis of the main surface of the first sensor portion 12 may be parallel to the long side of the main surface of the second sensor portion 13. Further, in the state that the sheet 11 is expanded in a plane, each of the front main surface and the back main surface of the first sensor portion 12, and each of the front main surface and the back main surface of the second sensor portion 13 each may have an elliptical shape. In the case above, in the state that the sheet 11 is expanded in a plane, a long axis of the main surface of the first sensor portion 12 may be parallel to a long axis of the main surface of the second sensor portion 13.

For example, in the state that the sheet 11 is expanded in a plane, the front main surface and the back main surface of the first sensor portion 12 may have a square shape. In the case above, in the state that the sheet 11 is expanded in a plane, at least one of the sides of the main surface of the first sensor portion 12 may be parallel to the long side of the main surface of the second sensor portion 13. Further, in the state that the sheet 11 is expanded in a plane, each of the front main surface and the back main surface of the first sensor portion 12, and each of the front main surface and the back main surface of the second sensor portion 13 each may have a square shape. In the case above, at least one of the sides of the main surface of the first sensor portion 12 may be parallel to at least one of the sides of the main surface of the second sensor portion 13.

In the state that the sheet 11 is expanded in a plane, a position of the first center point CP1 of the first sensor portion 12 and a position of the second center point CP2 of the second sensor portion 13 may be different from each other in the up-down direction.

In the state that the sheet 11 is expanded in a plane, the first sensor portion 12 and the second sensor portion 13 may be arranged side by side in the up-down direction.

In the state that the sheet 11 is expanded in a plane, the back main surface of the first sensor portion 12 may have a portion not overlapping the back main surface of the second sensor portion 13 in a view in the front-back direction.

A section of an object to be measured perpendicular to the first direction DIR1 is not limited to a circle. The section of the object to be measured perpendicular to the first direction DIR1 may be an ellipse or a polygon, for example.

The object to be measured may have a shape not extending in the first direction DIR1.

The number of sensor portions may be three or more.

First Modification

Figure 6:
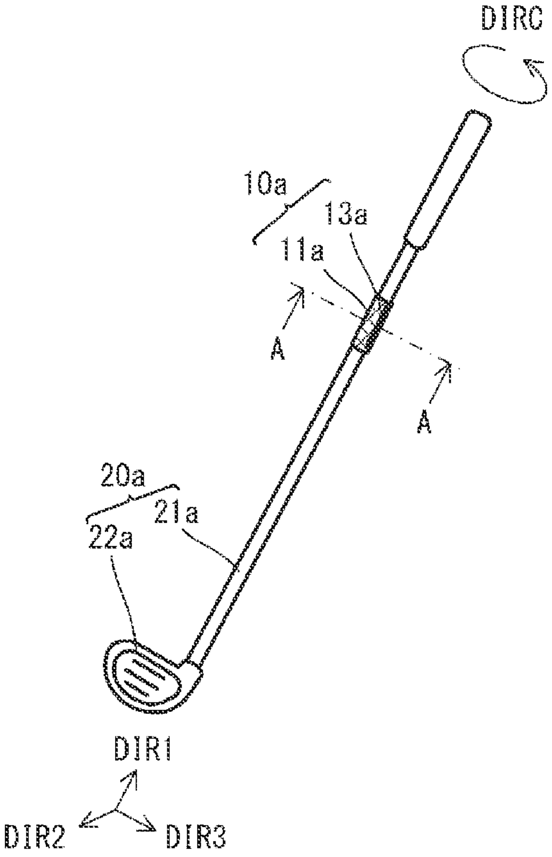
FIG. 6 is a perspective view of a sensor unit 10*a* according to a first modification in a state of being attached to a shaft 21*a*.
Figure 7:
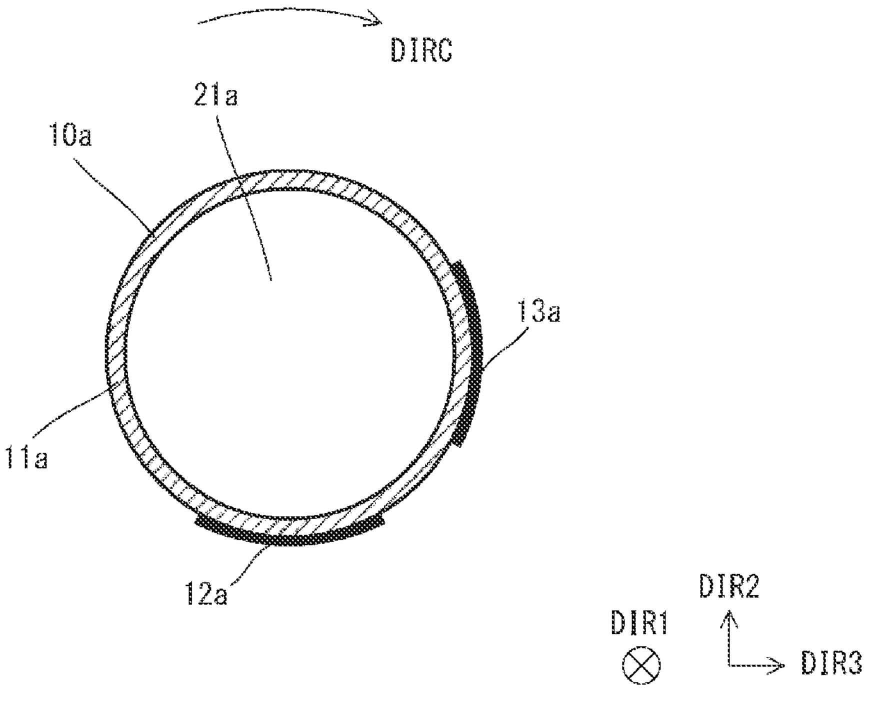
FIG. 7 is a sectional view of the sensor unit 10*a* according to the first modification in the state of being attached to the shaft 21*a* taken along a line A-A.

Hereinafter, a sensor unit 10*a* according to a first modification will be described with reference to the accompanying drawings. FIG. 6 is a perspective view of the sensor unit 10*a* according to the first modification in a state of being attached to a shaft 21*a*. FIG. 7 is a sectional view of the sensor unit 10*a* according to the first modification in the state of being attached to the shaft 21*a* taken along a line A-A. In the first modification, only portions different from the arrangement structure of the sensor unit according to the first embodiment will be described, and other descriptions will be omitted.

The sensor unit 10*a* differs from the sensor unit 10 in a state of attaching to the shaft 21*a*. In more detail, in a state that the sensor unit 10*a* is attached to the shaft 21*a*, a sheet 11*a* is disposed between the shaft 21*a* and a first sensor portion 12*a*, and between the shaft 21*a* and a second sensor portion 13*a*.

As illustrated in FIG. 6, the sensor unit 10*a* is attached to a circumferential surface of the shaft 21*a*. Specifically, an adhesive layer (not illustrated) is provided on a back main surface of the sheet 11*a*. The adhesive layer has an insulation property. The back main surface of the sheet 11*a* is attached to the shaft 21*a* by an adhesive layer (not illustrated) provided on the back main surface of the sheet 11*a*. In a state that sensor unit 10*a* is attached to the shaft 21*a*, an extending direction of each of an upper long side and a lower long side of a front main surface of the sheet 11*a* is the same direction as the circumferential direction DIRC.

As illustrated in FIG. 7, in the state that the sensor unit 10*a* is attached to the shaft 21*a*, the sheet 11*a* is disposed between the shaft 21*a* and the first sensor portion 12*a*, and between the shaft 21*a* and the second sensor portion 13*a*. As described above, each of the upper long side and the lower long side of the front main surface of the sheet 11*a* extends in the same direction as the circumferential direction DIRC. Thus, a first distance D1*a* is equal to a distance in the circumferential direction DIRC between a first center point CP1*a* of the first sensor portion 12*a* and a second center point CP2*a* of the second sensor portion 13*a*. Further, as described above, in a state that the sheet 11*a* is expanded in a plane, the first distance D1*a* is equal to one-fourth of a circumferential length of a sectional circle of the shaft 21*a*. Thus, the first center point CP1*a* of the first sensor portion 12*a* and the second center point CP2*a* of the second sensor portion 13*a* are disposed to be separated from each other by 90 degrees in the circumferential direction DIRC of the shaft 21*a*.

In the sensor unit 10*a* as described above as well, the same operational effects as those of the sensor unit 10 are achieved.

Second Embodiment

Hereinafter, a sensor unit according to a second embodiment of the present disclosure will be described with reference to the accompanying drawings.

Figure 8:
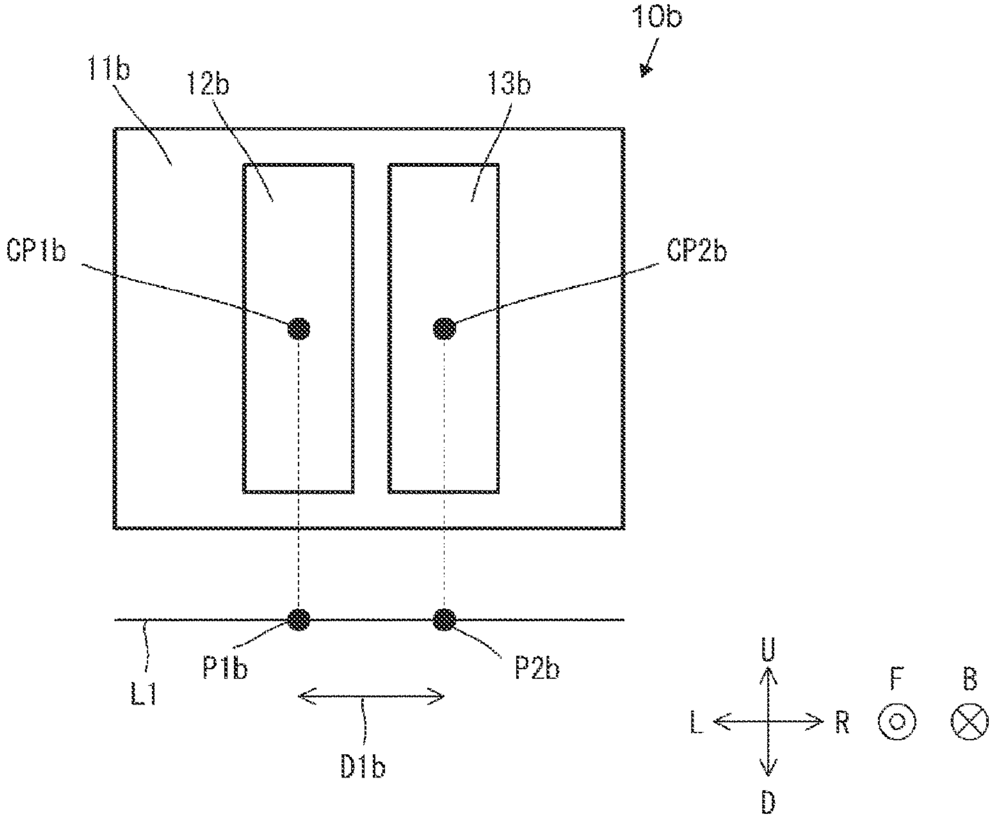
FIG. 8 is a plan view of a sensor unit 10*b* in a state that a sheet 11*b* according to a second embodiment is expanded in a plane.
Figure 9:
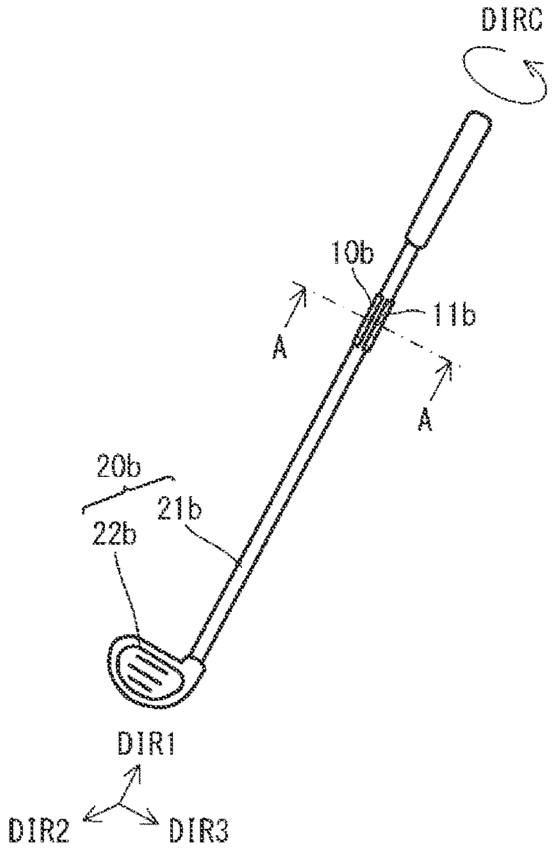
FIG. 9 is a perspective view of the sensor unit 10*b* according to the second embodiment in a state of being attached to a shaft 21*b*.
Figure 10:
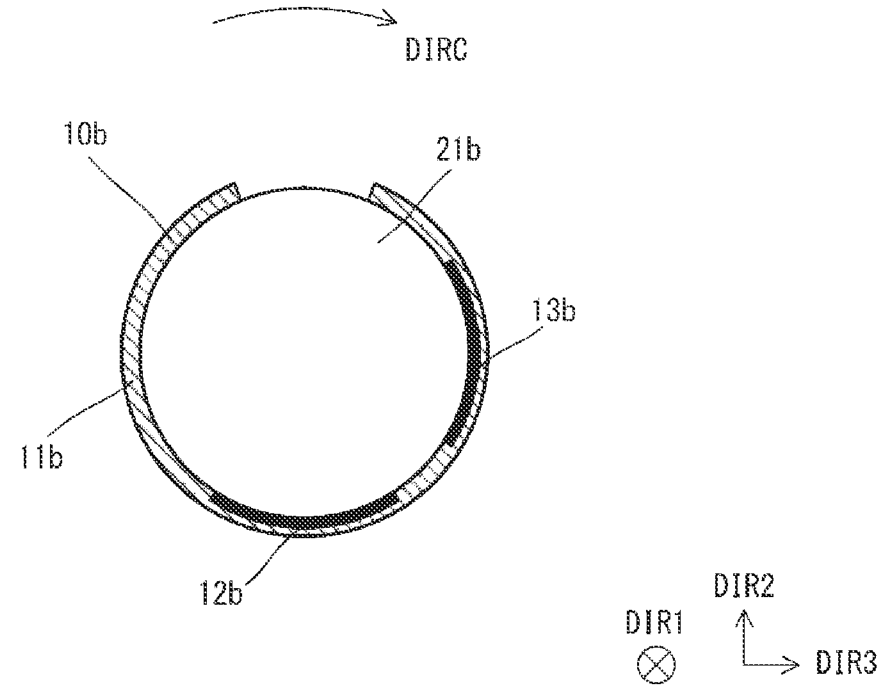
FIG. 10 is a sectional view of the sensor unit 10*b* according to the second embodiment in the state of being attached to the shaft 21*b* taken along a line A-A.

FIG. 8 is a plan view of a sensor unit 10*b* in a state that a sheet 11*b* according to the second embodiment is expanded in a plane. FIG. 9 is a perspective view of the sensor unit 10*b* according to the second embodiment in a state of being attached to a shaft 21*b*. FIG. 10 is a sectional view of the sensor unit 10*b* according to the second embodiment in the state of being attached to the shaft 21*b* taken along a line A-A. In the second embodiment, only portions different from the arrangement structure of the sensor unit according to the first embodiment will be described, and other descriptions will be omitted.

As illustrated in FIG. 8 to FIG. 10, in the state that the sheet 11*b* is expanded in a plane, a length of each of an upper long side and a lower long side of a front main surface of the sheet 11*b*, and a length of each of an upper long side and a lower long side of a back main surface of the sheet 11*b* each are shorter than a circumferential length of a sectional circle of the shaft 21*b*. Thus, in a state that the sensor unit 10*b* is attached to the shaft 21*b*, there is exposed a portion of a circumferential surface of the shaft 21*b* at the same position, in the first direction DIR1, as a first center point CP1*b* of a first sensor portion 12*b* or a second center point CP2*b* of a second sensor portion 13*b*.

In the sensor unit 10*b* as described above as well, the same operational effects as those of the sensor unit 10 are achieved. Further, the sensor unit 10*b* may easily be positioned while checking the position of the exposed portion of the circumferential surface of the shaft 21*b*.

Third Embodiment

Hereinafter, a sensor unit according to a third embodiment of the present disclosure will be described with reference to the accompanying drawings.

Figure 11:
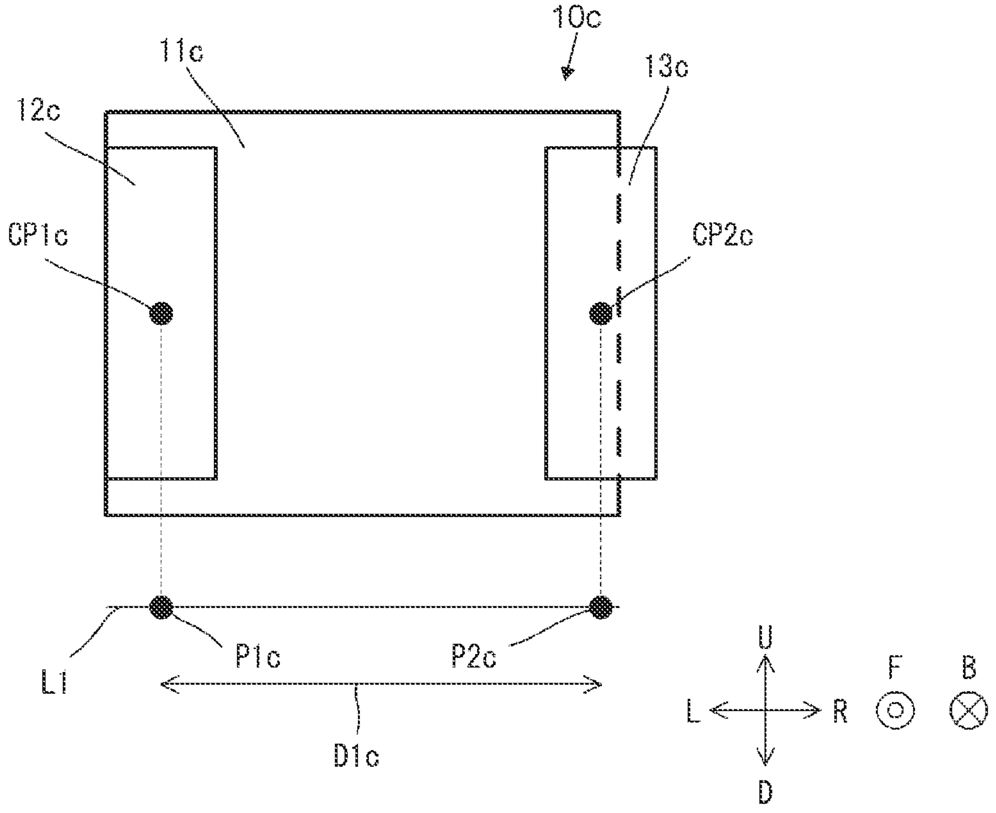
FIG. 11 is a plan view of a sensor unit 10*c* in a state that a sheet 11*c* according to a third embodiment is expanded in a plane.
Figure 12:
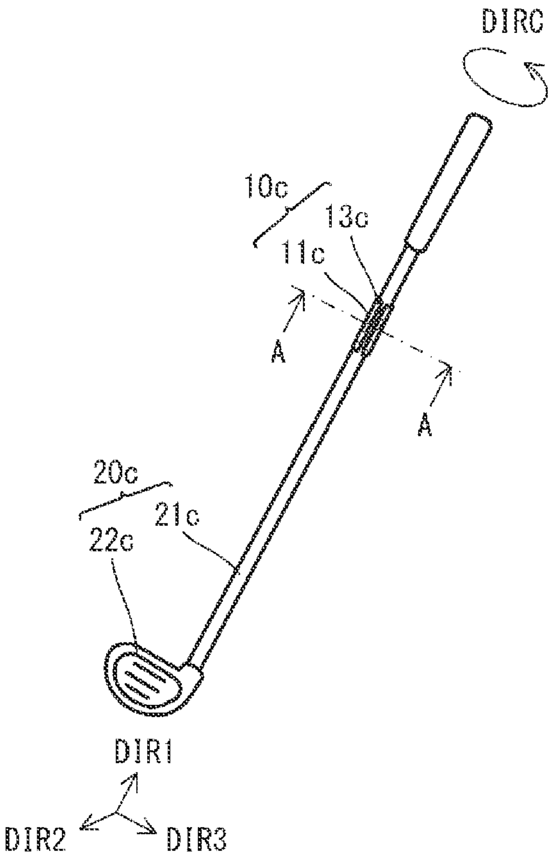
FIG. 12 is a perspective view of the sensor unit 10*c* according to the third embodiment in a state of being attached to a shaft 21*c*.
Figure 13:
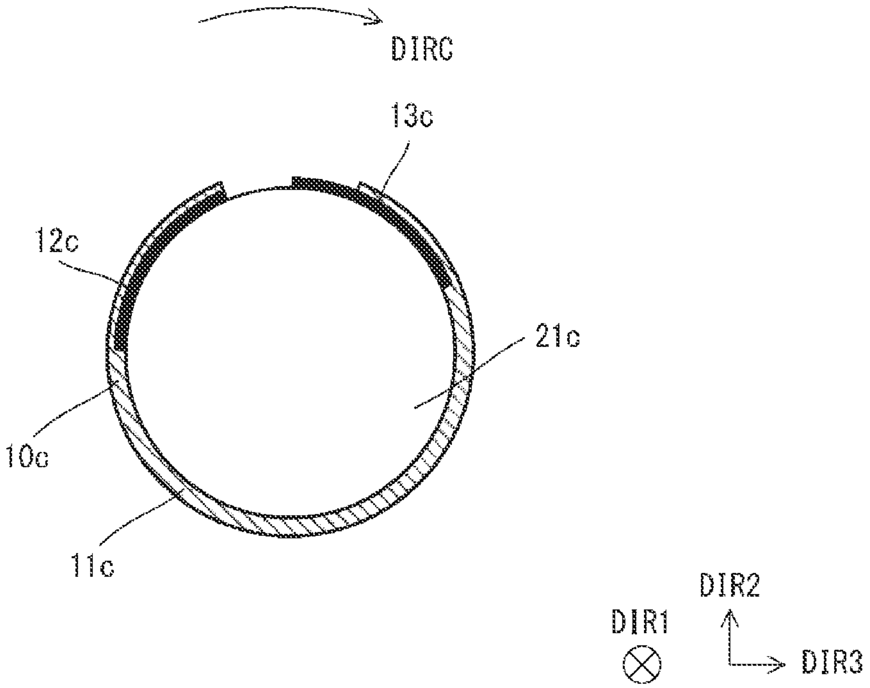
FIG. 13 is a sectional view of the sensor unit 10*c* according to the third embodiment in the state of being attached to the shaft 21*c* taken along a line A-A.

FIG. 11 is a plan view of a sensor unit 10*c* in a state that a sheet 11*c* according to the third embodiment is expanded in a plane. FIG. 12 is a perspective view of the sensor unit 10*c* according to the third embodiment in a state of being attached to a shaft 21*c*. FIG. 13 is a sectional view of the sensor unit 10*c* according to the third embodiment in the state of being attached to the shaft 21*c* taken along a line A-A. In the third embodiment, only portions different from the arrangement structure of the sensor unit according to the first embodiment will be described, and other descriptions will be omitted.

As illustrated in FIG. 11 to FIG. 13, in the state that the sheet 11*c* is expanded in a plane, a front main surface of a second sensor portion 13*c* has a portion not overlapping a front main surface of the sheet 11*c* in a view in the front-back direction. Further, in the state that the sheet 11*c* is expanded in a plane, a length of each of an upper long side and a lower long side of the front main surface of the sheet 11*c*, and a length of each of an upper long side and a lower long side of a back main surface of the sheet 11*c* each are shorter than a circumferential length of a sectional circle of the shaft 21*c*. Thus, in a state that the sensor unit 10*c* is attached to the shaft 21*c*, there is exposed a portion of a circumferential surface of the shaft 21*c* and a portion of a back main surface of the second sensor portion 13*c* at the same position, in the first direction DIR1, as a first center point CP1*c* of a first sensor portion 12*c* or a second center point CP2*c* of the second sensor portion 13*c*.

In the state that the sheet 11*c* is expanded in a plane, a first distance D1*c* in the present embodiment is equal to three-fourths of the circumferential length of the sectional circle of the shaft 21*c*. Thus, the first center point CP1*c* of the first sensor portion 12*c* and the second center point CP2*c* of the second sensor portion 13*c* are disposed to be separated from each other by 90 degrees in the circumferential direction DIRC of the shaft 21*c*.

In the sensor unit 10*c* as described above as well, the same operational effects as those of the sensor unit 10 are achieved. Further, the sensor unit 10*c* may easily be positioned while checking the position of the exposed portion of the circumferential surface of the shaft 21*c*. Furthermore, even when the first sensor portion 12*c* and the second sensor portion 13*c* receive force in a contraction direction, the force received from the sheet 11*c* by the first sensor portion 12*c* and the second sensor portion 13*c* may be released from the exposed portion of the circumferential surface of the shaft 21*c*, thereby improving the adhesiveness of the shaft 21*c* and the first sensor portion 12*c* and the adhesiveness of the shaft 21*c* and the second sensor portion 13*c*.

In the state that the sheet 11*c* is expanded in a plane, it is sufficient that the front main surface of at least one of the first sensor portion 12*c* and the second sensor portion 13*c* has a portion not overlapping the front main surface of the sheet 11*c* in a view in the front-back direction.

Fourth Embodiment

Hereinafter, a sensor unit according to a fourth embodiment of the present disclosure will be described with reference to the accompanying drawings.

Figure 14:
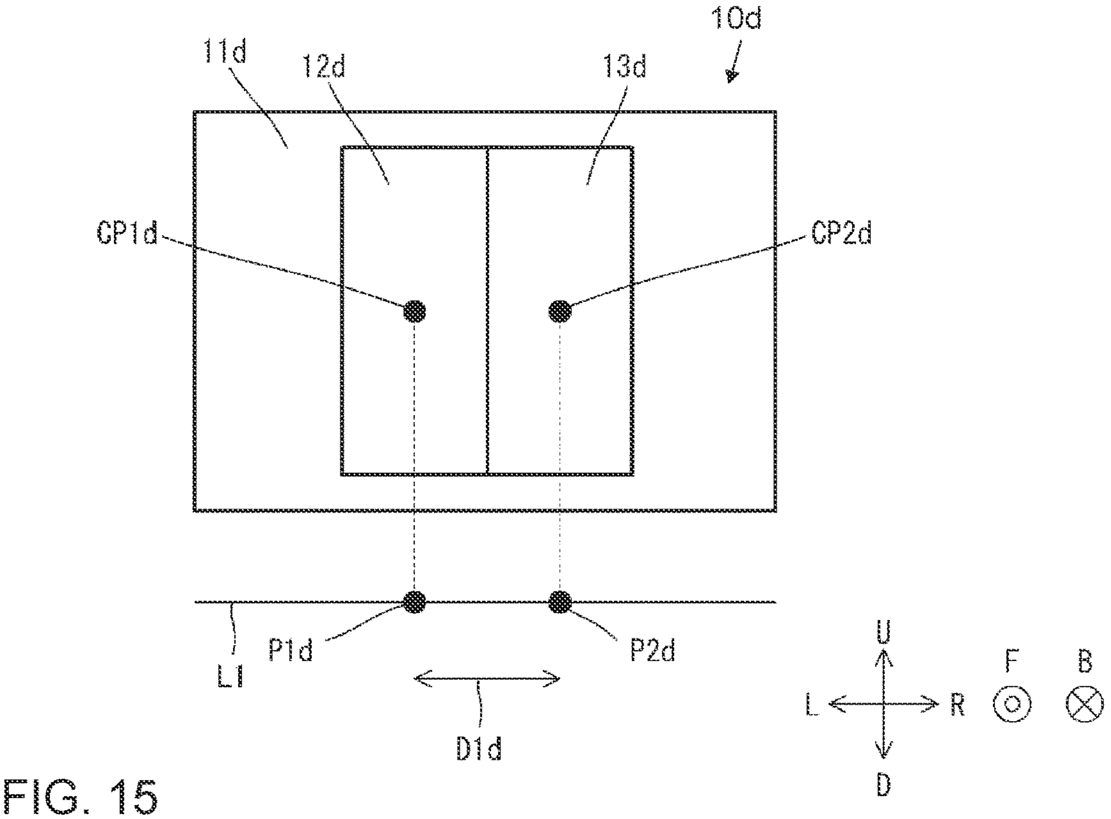
FIG. 14 is a plan view of a sensor unit 10*d* in a state that a sheet 11*d* according to a fourth embodiment is expanded in a plane.
Figure 15:
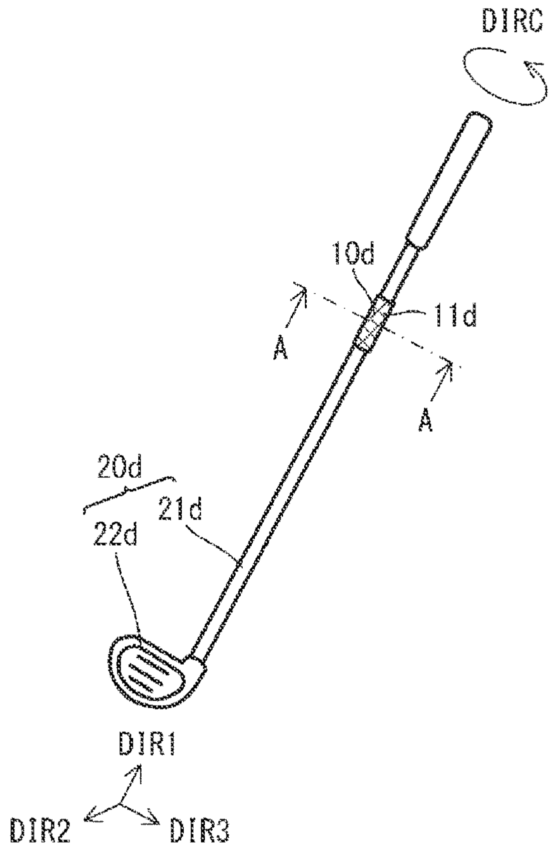
FIG. 15 is a perspective view of the sensor unit 10*d* according to the fourth embodiment in a state of being attached to a shaft 21*d*.
Figure 16:
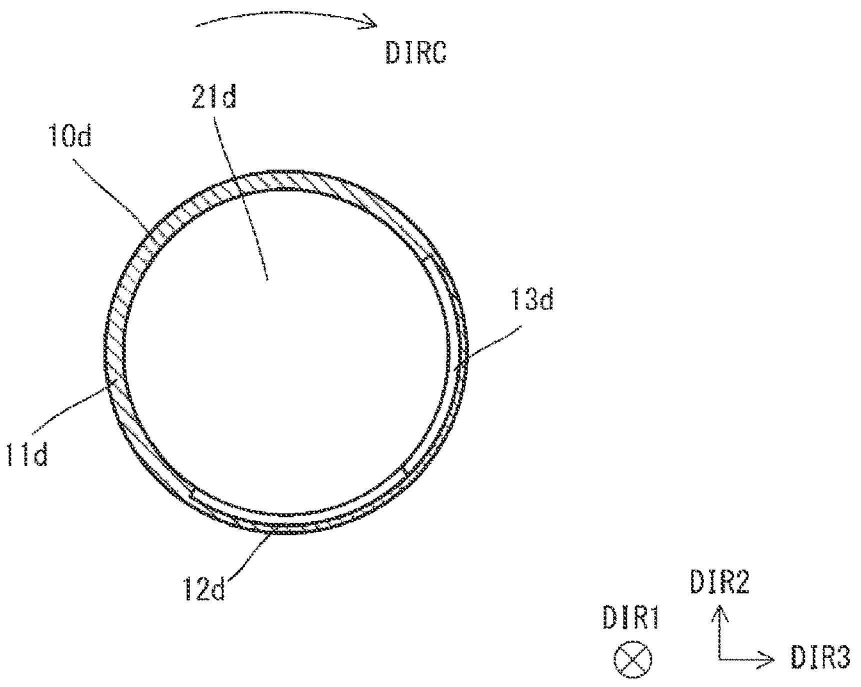
FIG. 16 is a sectional view of the sensor unit 10*d* according to the fourth embodiment in the state of being attached to the shaft 21*d* taken along a line A-A.

FIG. 14 is a plan view of a sensor unit 10*d* in a state that a sheet 11*d* according to the fourth embodiment is expanded in a plane. FIG. 15 is a perspective view of the sensor unit 10*d* according to the fourth embodiment in a state of being attached to a shaft 21*d*. FIG. 16 is a sectional view of the sensor unit 10*d* according to the fourth embodiment in the state of being attached to the shaft 21*d* taken along a line A-A. In the fourth embodiment, only portions different from the arrangement structure of the sensor unit according to the first embodiment will be described, and other descriptions will be omitted.

As illustrated in FIG. 14 to FIG. 16, part of an outer edge of a front main surface of a first sensor portion 12*d* and part of an outer edge of a front main surface of a second sensor portion 13*d* are in contact with each other. In the present embodiment, a right long side of the front main surface of the first sensor portion 12*d* and a left long side of the front main surface of the second sensor portion 13*d* are in contact with each other.

In the sensor unit 10*d* as described above as well, the same operational effects as those of the sensor unit 10 are achieved. Further, in a state that the sensor unit 10*d* is attached to the shaft 21*d*, a center point of each of the first sensor portion 12*d* and the second sensor portion 13*d* may easily be confirmed, and the sensor unit 10*d* may more easily be positioned.

Part of the outer edge of the front main surface of the first sensor portion 12*d* and part of the outer edge of the front main surface of the second sensor portion 13*d* may be in contact with each other via an adhesive layer having an insulation property.

Part of an outer edge of a back main surface of the first sensor portion 12*d* and part of an outer edge of a back main surface of the second sensor portion 13*d* may be in contact with each other. Part of the outer edge of the back main surface of the first sensor portion 12*d* and part of the outer edge of the back main surface of the second sensor portion 13*d* may be in contact with each other via an adhesive layer having an insulation property.

Fifth Embodiment

Hereinafter, a sensor unit according to a fifth embodiment of the present disclosure will be described with reference to the accompanying drawings.

Figure 17:
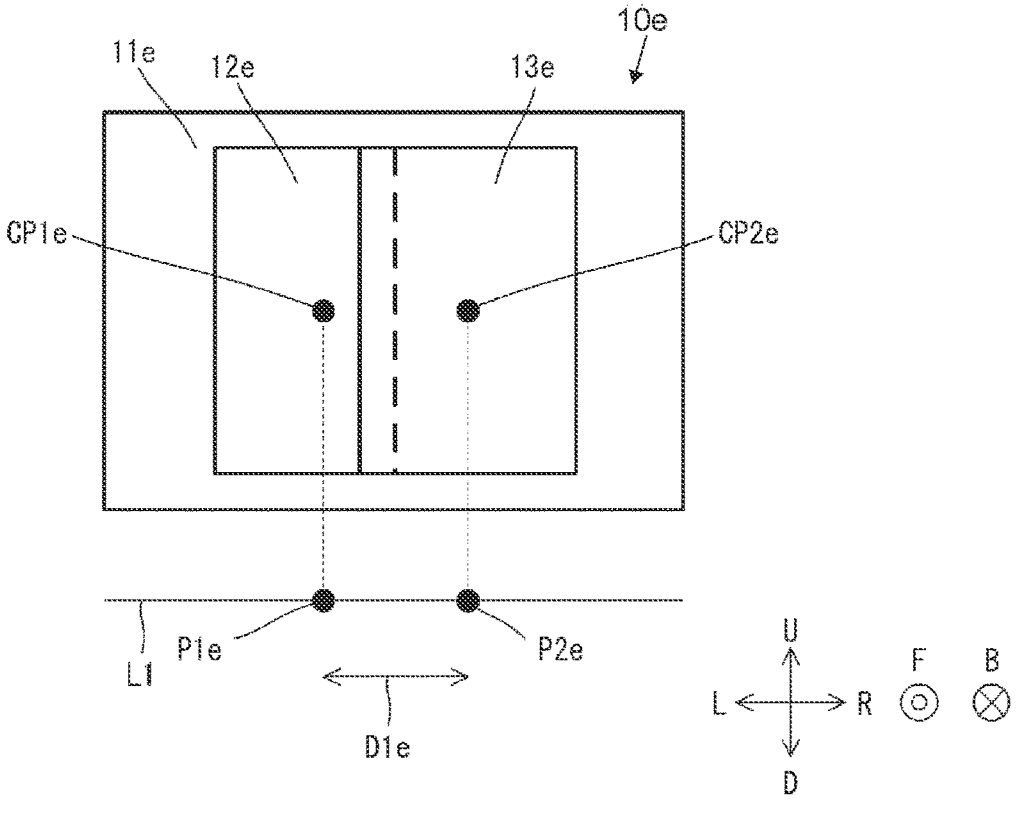
FIG. 17 is a plan view of a sensor unit 10*e* in a state that a sheet 11*e* according to a fifth embodiment is expanded in a plane.
Figure 18:
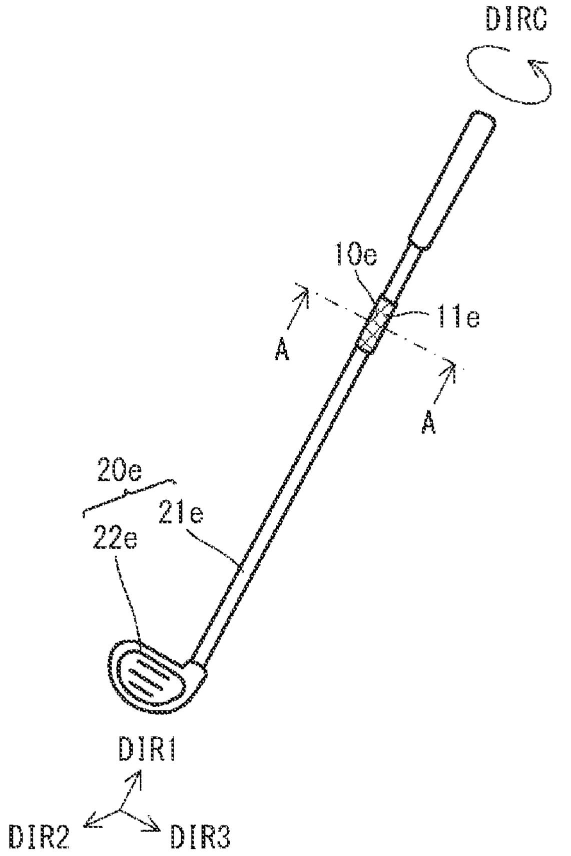
FIG. 18 is a perspective view of the sensor unit 10*e* according to the fifth embodiment in a state of being attached to a shaft 21*e*.
Figure 19:
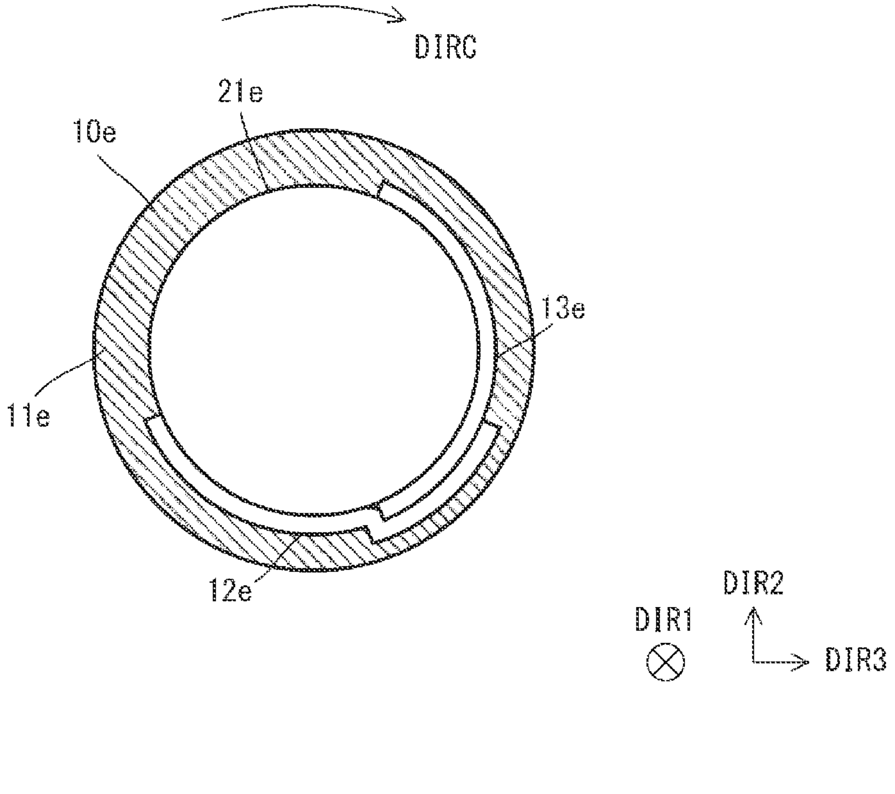
FIG. 19 is a sectional view of the sensor unit 10*e* according to the fifth embodiment in the state of being attached to the shaft 21*e* taken along a line A-A.

FIG. 17 is a plan view of a sensor unit 10*e* in a state that a sheet 11*e* according to the fifth embodiment is expanded in a plane. FIG. 18 is a perspective view of the sensor unit 10*e* according to the fifth embodiment in a state of being attached to a shaft 21*e*. FIG. 19 is a sectional view of the sensor unit 10*e* according to the fifth embodiment in the state of being attached to the shaft 21*e* taken along a line A-A. In the fifth embodiment, only portions different from the arrangement structure of the sensor unit according to the first embodiment will be described, and other descriptions will be omitted.

As illustrated in FIG. 17 to FIG. 19, in a state that the sheet 11*e* is expanded in a plane, a front main surface of a first sensor portion 12*e* has a portion overlapping a front main surface of a second sensor portion 13*e* in a view in the front-back direction. In a state that the sheet 11*e* is expanded in a plane, the front main surface of the second sensor portion 13*e* has a portion overlapping the front main surface of the first sensor portion 12*e* in a view in the front-back direction.

In the sensor unit 10*e* as described above as well, the same operational effects as those of the sensor unit 10 are achieved. Further, an area of each of the front main surface and a back main surface of the first sensor portion 12*e* and an area of each of the front main surface and a back main surface of the second sensor portion 13*e* may be enlarged. This makes it possible to enlarge an area, for detecting electric charge, of each of the first sensor portion 12*e* and the second sensor portion 13*e*. Thus, output-voltage sensitivity of each of the first sensor portion 12*e* and the second sensor portion 13*e* may be increased, and the detection accuracy of the sensor unit 10*e* may be increased.

Sixth Embodiment

Figure 20:
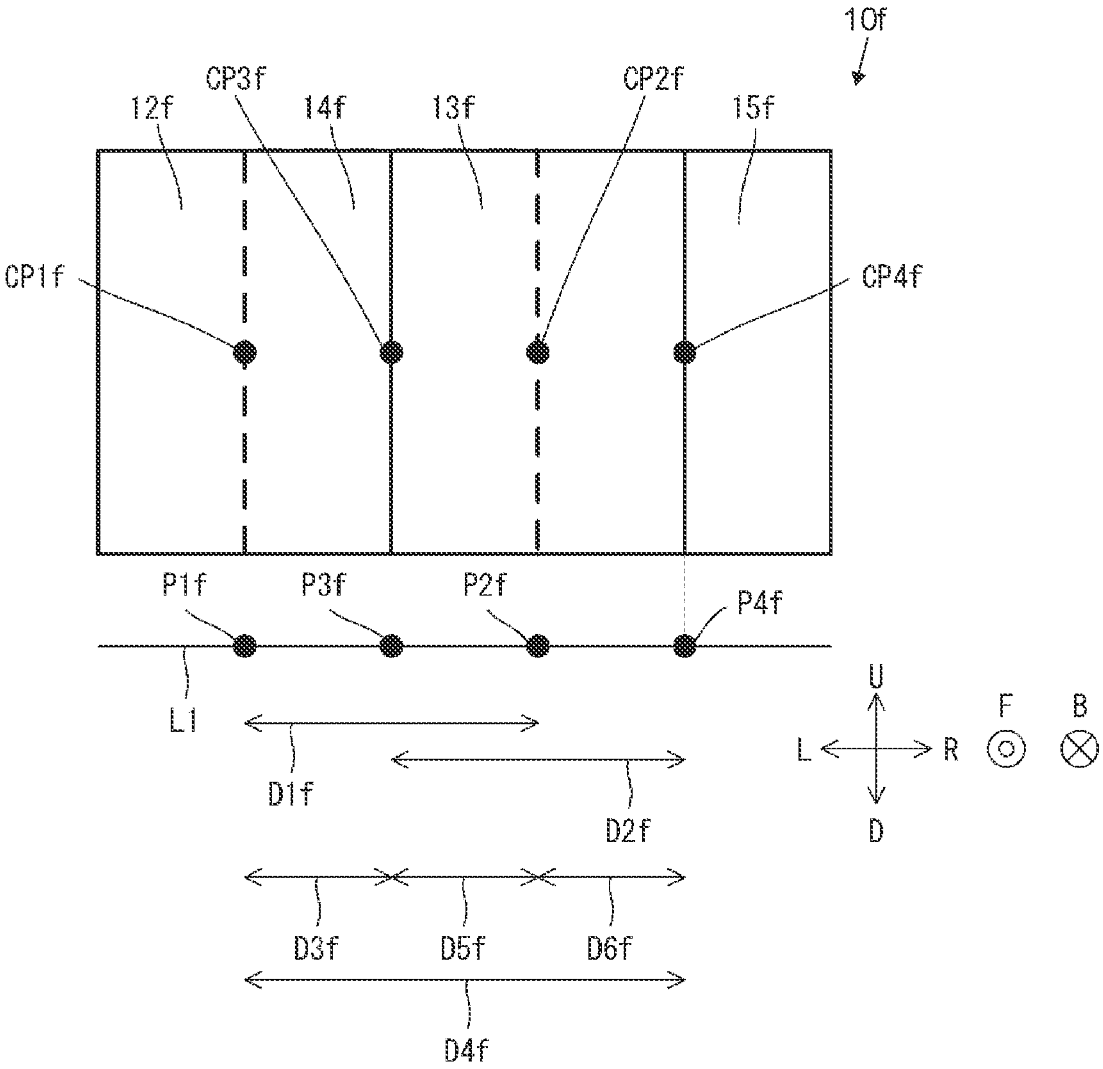
FIG. 20 is a plan view of a sensor unit 10*f* in a state that the sensor unit 10*f* according to a sixth embodiment is expanded in a plane.
Figure 21:
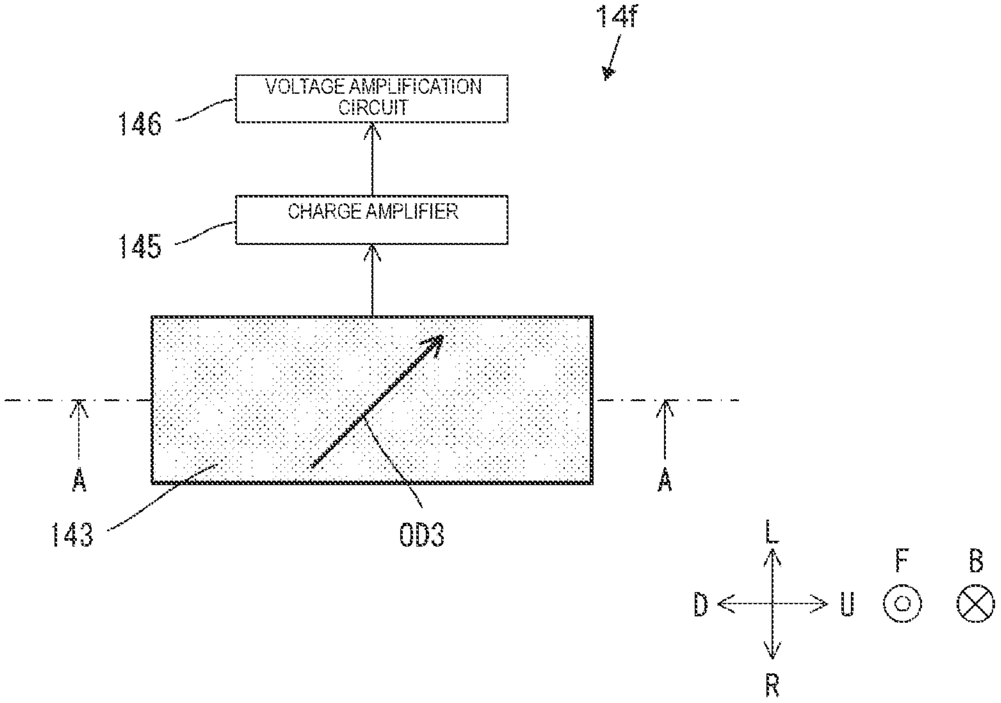
FIG. 21 is a plan view and a sectional view of a third sensor portion 14*f* in the state that the sensor unit 10*f* according to the sixth embodiment is expanded in a plane.
Figure 21:
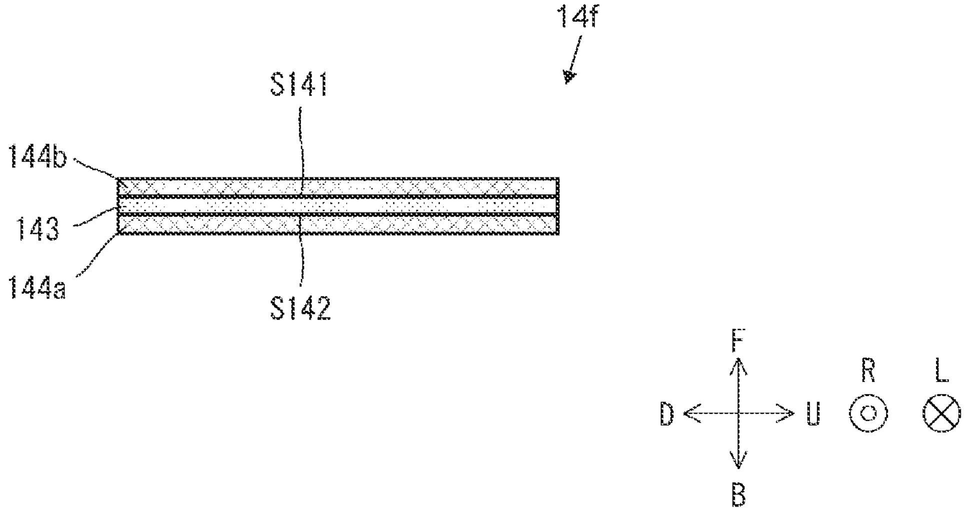
Figure 22:
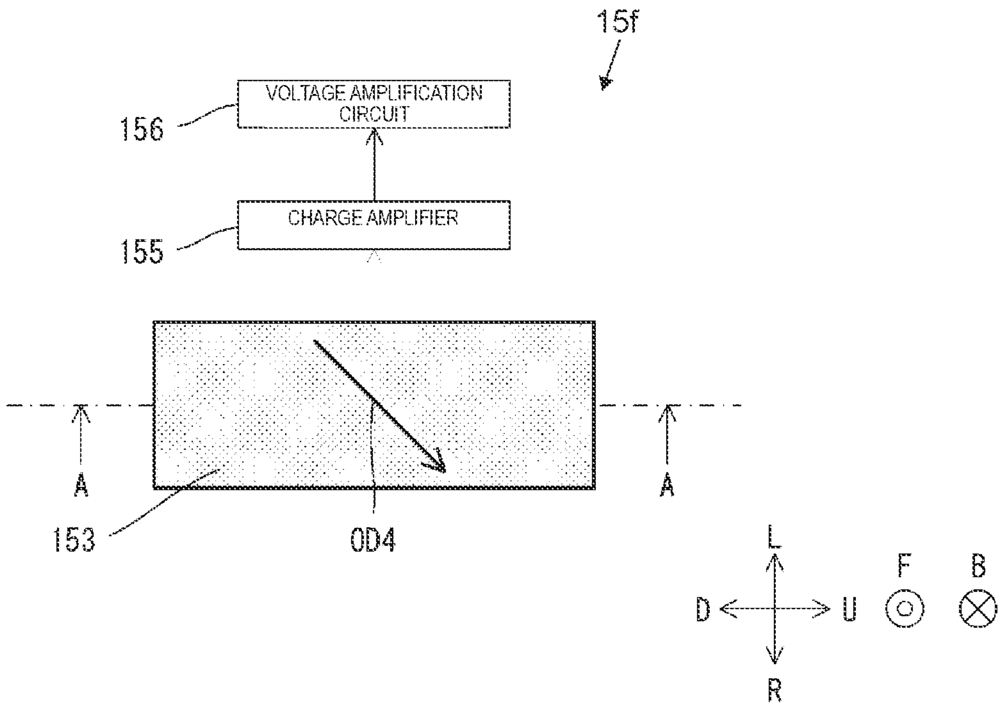
FIG. 22 is a plan view and a sectional view of a fourth sensor portion 15*f* in the state that the sensor unit 10*f* according to the sixth embodiment is expanded in a plane.
Figure 22:
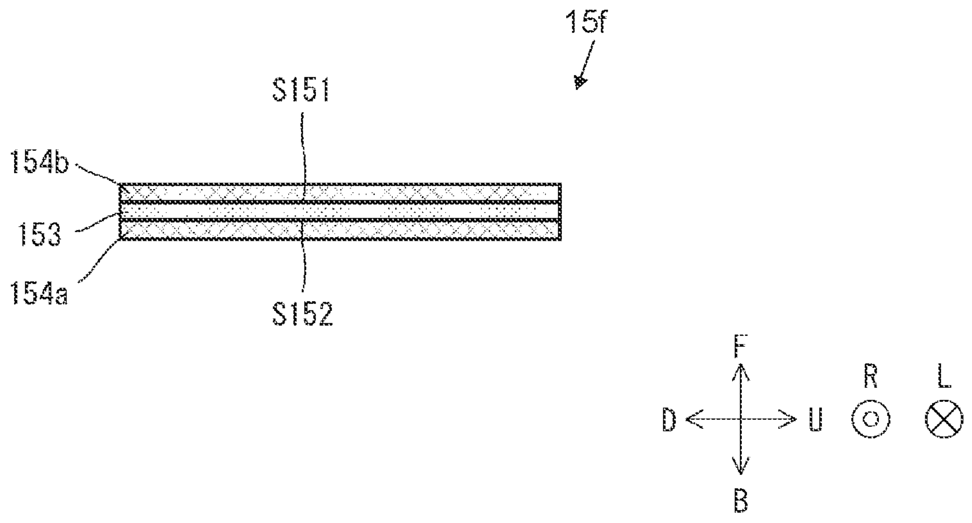
Figure 23:
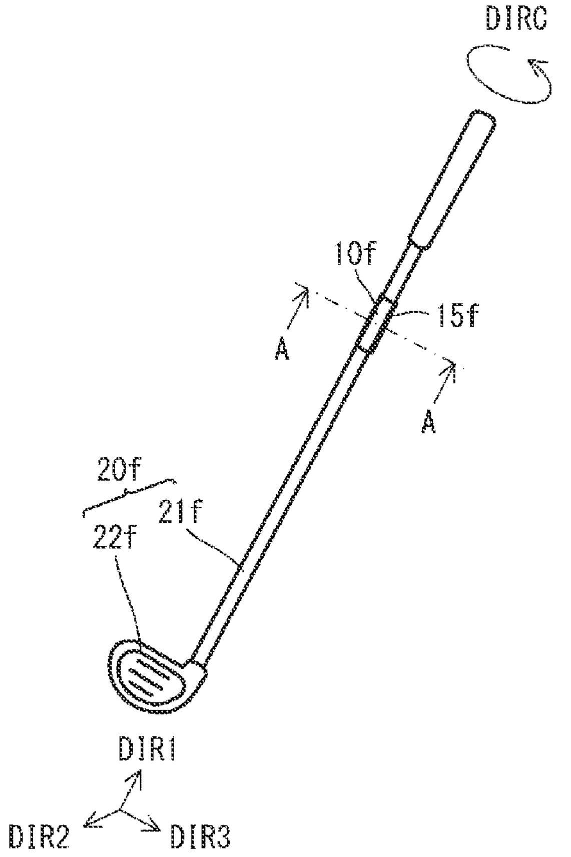
FIG. 23 is a perspective view of the sensor unit 10*f* according to the sixth embodiment in a state of being attached to a shaft 21*f*.
Figure 24:
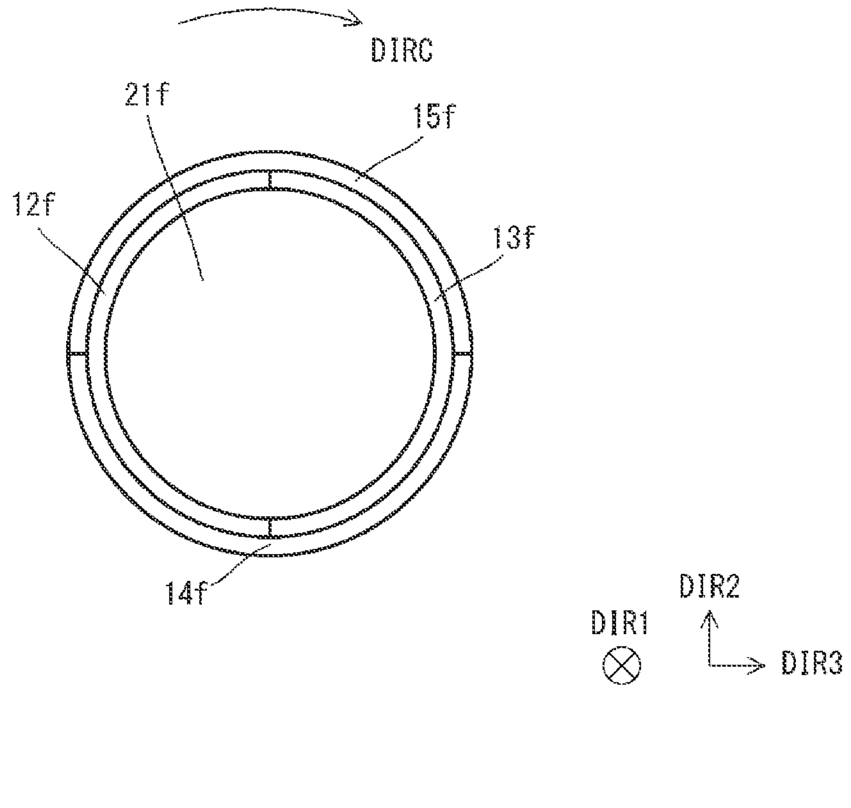
FIG. 24 is a sectional view of the sensor unit 10*f* according to the sixth embodiment in the state of being attached to the shaft 21*f* taken along a line A-A.

Hereinafter, a sensor unit according to a sixth embodiment of the present disclosure will be described with reference to the accompanying drawings. FIG. 20 is a plan view of a sensor unit 10*f* in a state that the sensor unit 10*f* according to the sixth embodiment is expanded in a plane. FIG. 21 is a plan view and a sectional view of a third sensor portion 14*f* in the state that the sensor unit 10*f* according to the sixth embodiment is expanded in a plane. FIG. 22 is a plan view and a sectional view of a fourth sensor portion 15*f* in the state that the sensor unit 10*f* according to the sixth embodiment is expanded in a plane. FIG. 23 is a perspective view of the sensor unit 10*f* according to the sixth embodiment in a state of being attached to a shaft 21*f*. FIG. 24 is a sectional view of the sensor unit 10*f* according to the sixth embodiment in the state of being attached to the shaft 21*f* taken along a line A-A. In the sixth embodiment, only portions different from the arrangement structure of the sensor unit according to the first embodiment will be described, and other descriptions will be omitted.

As illustrated in FIG. 20, the sensor unit 10*f* includes a first sensor portion 12*f*, a second sensor portion 13*f*, the third sensor portion 14*f*, and the fourth sensor portion 15*f*. The third sensor portion 14*f* in the present embodiment corresponds to the sheet 11 and 11*b* to 11*e* in the first embodiment to the fifth embodiment.

A deformation direction detected by the first sensor portion 12*f* and a deformation direction detected by the second sensor portion 13*f*, of the shaft 21*f* being an object to be measured, are the same.

The third sensor portion 14*f* detects deformation of the shaft 21*f* being the object to be measured, and has a film shape. Note that, the deformation direction detected by the first sensor portion 12*f* and the deformation direction detected by the third sensor portion 14*f*, of the shaft 21*f* being the object to be measured, are different from each other. The third sensor portion 14*f* has a front main surface and a back main surface. A back main surface of the first sensor portion 12*f* and a back main surface of the second sensor portion 13*f* each are attached to a front main surface of the third sensor portion 14*f*.

As illustrated in FIG. 21, the third sensor portion 14*f* includes a piezoelectric film 143, a first electrode 144*a*, a second electrode 144*b*, a charge amplifier 145, and a voltage amplification circuit 146. The piezoelectric film 143 is an example of a piezoelectric body. The piezoelectric film 143 has a sheet shape. The piezoelectric film 143 (third piezoelectric body) has a front main surface S141 and a back main surface S142. In a state that the sensor unit 10*f* is expanded in a plane, the front main surface S141 and the back main surface S142 of the piezoelectric film 143 (third piezoelectric body) each have a rectangular shape having a left long side and a right long side that are extending in the up-down direction, and an upper short side and a lower short side that are extending in the left-right direction in a view in the front-back direction. In the present embodiment, a longitudinal direction of the piezoelectric film 143 (third piezoelectric body) of the third sensor portion 14*f* is the up-down direction, and a lateral direction of the piezoelectric film 143 (third piezoelectric body) of the third sensor portion 14*f* is the left-right direction. In the present embodiment, the piezoelectric film 143 is a PLA film. The PLA film is the same as that of the first embodiment and will not be described. In the present embodiment, a uniaxial extension axis OD3 of the piezoelectric film 143 (third piezoelectric body) forms an angle of 45 degrees counterclockwise relative to the up-down direction. That is, the piezoelectric film 143 (third piezoelectric body) is extended in at least one axial direction.

The first electrode 144*a* is a signal electrode. As illustrated in FIG. 21, the first electrode 144*a* is provided on the back main surface S142. The first electrode 144*a* covers the back main surface S142. The first electrode 144*a* is an organic electrode such as indium tin oxide (ITO) and zinc oxide (ZnO), a metal coat formed by vapor deposition or plating, or a printed electrode film formed by silver paste, for example.

The second electrode 144*b* is a ground electrode. The second electrode 144*b* is coupled to the ground electric potential. As illustrated in FIG. 21, the second electrode 144*b* is provided on the front main surface S141. Thus, the piezoelectric film 143 is positioned between the first electrode 144*a* and the second electrode 144*b*. The second electrode 144*b* covers the front main surface S141. The second electrode 144*b* is an organic electrode such as indium tin oxide (ITO) and zinc oxide (ZnO), a metal coat formed by vapor deposition or plating, or a printed electrode film formed by silver paste, for example.

The charge amplifier 145 converts electric charge generated by the piezoelectric film 143 into a detection signal, being a voltage signal, and outputs the detection signal to the voltage amplification circuit 146. The voltage amplification circuit 146 amplifies and outputs the detection signal.

In the state that the sensor unit 10*f* is expanded in a plane, a length of each of an upper short side and a lower short side of the front main surface of the third sensor portion 14*f*, and a length of each of an upper short side and a lower short side of a back main surface of the third sensor portion 14*f* each are shorter than a circumferential length of a sectional circle of the shaft 21*f* being an object to be measured.

The third sensor portion 14*f* described above is fixed to the first sensor portion 12*f* and the second sensor portion 13*f* via an adhesive layer (not illustrated). The adhesive layer has an insulation property. Specifically, the adhesive layer fixes a left portion of the second electrode 144*b* and a right portion of the back main surface of the first sensor portion 12*f*. That is, a left portion of the front main surface of the third sensor portion 14*f* is fixed to the right portion of the back main surface of the first sensor portion 12*f*. Thus, a left portion of the third sensor portion 14*f* overlaps a right portion of the first sensor portion 12*f* in a view in the front-back direction. That is, in the state that the sensor unit 10*f* is expanded in a plane, the front main surface of the third sensor portion 14*f* has a portion overlapping the front main surface of the first sensor portion 12*f* in a view in the front-back direction.

The adhesive layer fixes a right portion of the second electrode 144*b* and a left portion of a back main surface of the second sensor portion 13*f*. That is, a right portion of the front main surface of the third sensor portion 14*f* is fixed to the left portion of the back main surface of the second sensor portion 13*f*. Thus, a right portion of the third sensor portion 14*f* overlaps a left portion of the second sensor portion 13*f* in a view in the front-back direction. That is, in the state that the sensor unit 10*f* is expanded in a plane, the front main surface of the third sensor portion 14*f* has a portion overlapping the front main surface of the second sensor portion 13*f* in a view in the front-back direction.

The fourth sensor portion 15*f* detects deformation of the shaft 21*f* being the object to be measured, and has a film shape. Note that, a deformation direction detected by the third sensor portion 14*f* and a deformation direction detected by the fourth sensor portion 15*f*, of the shaft 21*f* being the object to be measured, are the same. The fourth sensor portion 15*f* has a front main surface and a back main surface. As illustrated in FIG. 22, the fourth sensor portion 15*f* includes a piezoelectric film 153, a first electrode 154*a*, a second electrode 154*b*, a charge amplifier 155, and a voltage amplification circuit 156. The piezoelectric film 153 has a sheet shape. The piezoelectric film 153 (fourth piezoelectric body) has a front main surface S151 and a back main surface S152. In the state that the sensor unit 10*f* is expanded in a plane, the front main surface S151 and the back main surface S152 of the piezoelectric film 153 (fourth piezoelectric body) each have a rectangular shape having a left long side and a right long side that are extending in the up-down direction, and an upper short side and a lower short side that are extending in the left-right direction in a view in the front-back direction. In the present embodiment, a longitudinal direction of the piezoelectric film 153 (fourth piezoelectric body) is the up-down direction, and a lateral direction of the piezoelectric film 153 (fourth piezoelectric body) is the left-right direction. In the present embodiment, the piezoelectric film 153 is a PLA film. The PLA film is the same as that of the first embodiment and will not be described. In the present embodiment, a uniaxial extension axis OD4 of the piezoelectric film 153 (fourth piezoelectric body) forms an angle of 45 degrees clockwise relative to the up-down direction. That is, the piezoelectric film 153 (fourth piezoelectric body) is extended in at least one axial direction.

The first electrode 154*a* is a signal electrode. As illustrated in FIG. 22, the first electrode 154*a* is provided on the back main surface S152. The first electrode 154*a* covers the back main surface S152. The first electrode 154*a* is an organic electrode such as indium tin oxide (ITO) and zinc oxide (ZnO), a metal coat formed by vapor deposition or plating, or a printed electrode film formed by silver paste, for example.

The second electrode 154*b* is a ground electrode. The second electrode 154*b* is coupled to the ground electric potential. As illustrated in FIG. 22, the second electrode 154*b* is provided on the front main surface S151. Thus, the piezoelectric film 153 is positioned between the first electrode 154*a* and the second electrode 154*b*. The second electrode 154*b* covers the front main surface S151. The second electrode 154*b* is an organic electrode such as indium tin oxide (ITO) and zinc oxide (ZnO), a metal coat formed by vapor deposition or plating, or a printed electrode film formed by silver paste, for example.

The charge amplifier 155 converts electric charge generated by the piezoelectric film 153 into a detection signal, being a voltage signal, and outputs the detection signal to the voltage amplification circuit 156. The voltage amplification circuit 156 amplifies and outputs the detection signal.

In the state that the sensor unit 10*f* is expanded in a plane, a length of each of an upper short side and a lower short side of the front main surface of the fourth sensor portion 15*f*, and a length of each of an upper short side and a lower short side of a back main surface of the fourth sensor portion 15*f* each are shorter than the circumferential length of the sectional circle of the shaft 21*f* being the object to be measured.

The fourth sensor portion 15*f* described above is fixed to the second sensor portion 13*f* via an adhesive layer (not illustrated). The adhesive layer has an insulation property. Specifically, the adhesive layer fixes a left portion of the second electrode 154*b* and a right portion of the back main surface of the second sensor portion 13*f*. That is, a left portion of the front main surface of the fourth sensor portion 15*f* is fixed to the right portion of the back main surface of the second sensor portion 13*f*. Thus, a left portion of the fourth sensor portion 15*f* overlaps a right portion of the second sensor portion 13*f* in a view in the front-back direction. That is, in the state that the sensor unit 10*f* is expanded in a plane, the front main surface of the fourth sensor portion 15*f* has a portion overlapping the front main surface of the second sensor portion 13*f* in a view in the front-back direction.

As illustrated in FIG. 20, in the state that the sensor unit 10*f* is expanded in a plane, a sum of a length of an upper short side of the front main surface of the first sensor portion 12*f* and a length of an upper short side of the front main surface of the second sensor portion 13*f* is equal to or greater than the circumferential length of the sectional circle of the shaft 21*f* being the object to be measured.

In the state that the sensor unit 10*f* is expanded in a plane, a sum of the length of the upper short side of the front main surface of the third sensor portion 14*f* and the length of the upper short side of the front main surface of the fourth sensor portion 15*f* is equal to or greater than the circumferential length of the sectional circle of the shaft 21*f* being the object to be measured.

In the state that the sensor unit 10*f* is expanded in a plane, the front main surface of the first sensor portion 12*f* is disposed at a position not overlapping the front main surface of the second sensor portion 13*f* in a view in the front-back direction. That is, in the state that the sensor unit 10*f* is expanded in a plane, the front main surface of the first sensor portion 12*f* has a portion not overlapping the front main surface of the second sensor portion 13*f* in a view in the front-back direction. An adhesive layer (not illustrated) is provided on the front main surface of the first sensor portion 12*f*. The adhesive layer has an insulation property.

In the state that the sensor unit 10*f* is expanded in a plane, the front main surface of the second sensor portion 13*f* is disposed at a position not overlapping the front main surface of the first sensor portion 12*f* in a view in the front-back direction. That is, in the state that the sensor unit 10*f* is expanded in a plane, the front main surface of the second sensor portion 13*f* has a portion not overlapping the front main surface of the first sensor portion 12*f* in a view in the front-back direction. An adhesive layer (not illustrated) is provided on the front main surface of the second sensor portion 13*f*. The adhesive layer has an insulation property.

In the state that the sensor unit 10*f* is expanded in a plane, the front main surface of the third sensor portion 14*f* is disposed at a position not overlapping the front main surface of the fourth sensor portion 15*f* in a view in the front-back direction. That is, in the state that the sensor unit 10*f* is expanded in a plane, the front main surface of the third sensor portion 14*f* has a portion not overlapping the front main surface of the fourth sensor portion 15*f* in a view in the front-back direction.

In the state that the sensor unit 10*f* is expanded in a plane, the front main surface of the fourth sensor portion 15*f* is disposed at a position not overlapping the front main surface of the third sensor portion 14*f* in a view in the front-back direction. That is, in the state that the sensor unit 10*f* is expanded in a plane, the front main surface of the fourth sensor portion 15*f* has a portion not overlapping the front main surface of the third sensor portion 14*f* in a view in the front-back direction. The fourth sensor portion 15*f* is positioned to the right of the third sensor portion 14*f*.

In the state that the sensor unit 10*f* is expanded in a plane, part of an outer edge of the front main surface of the first sensor portion 12*f* and part of an outer edge of the front main surface of the second sensor portion 13*f* are in contact with each other. In the present embodiment, a right long side of the front main surface of the first sensor portion 12*f* and a left long side of the front main surface of the second sensor portion 13*f* are in contact with each other. Part of an outer edge of the main surface of the third sensor portion 14*f* and part of an outer edge of the main surface of the fourth sensor portion 15*f* are in contact with each other. In the present embodiment, a right long side of the front main surface of the third sensor portion 14*f* and a left long side of the front main surface of the fourth sensor portion 15*f* are in contact with each other.

As illustrated in FIG. 20, in the state that the sensor unit 10*f* is expanded in a plane, long sides of the first sensor portion 12*f* are parallel to each other, long sides of the second sensor portion 13*f* are parallel to each other, long sides of the third sensor portion 14*f* are parallel to each other, and long sides of the fourth sensor portion 15*f* are parallel to each other. In the state that the sensor unit 10*f* is expanded in a plane, short sides of the first sensor portion 12*f* are parallel to each other, short sides of the second sensor portion 13*f* are parallel to each other, short sides of the third sensor portion 14*f* are parallel to each other, and short sides of the fourth sensor portion 15*f* are parallel to each other.

As illustrated in FIG. 20, in the state that the sensor unit 10*f* is expanded in a plane, a third center point CP3*f* of the third sensor portion 14*f* is defined in a view in the front-back direction. The third center point CP3*f* is a center of gravity of the front main surface of the third sensor portion 14*f*, for example. The third center point CP3*f* may be a center of gravity of the back main surface of the third sensor portion 14*f*, for example. The third center point CP3*f* may be a center of the front main surface of the third sensor portion 14*f*, for example. At this time, when two diagonal lines are defined on the front main surface of the third sensor portion 14*f*, for example, the two diagonal lines intersect with each other at the third center point CP3*f*. When a straight line connecting midpoints of the two short sides and a straight line connecting midpoints of the two long sides are defined on the front main surface of the third sensor portion 14*f*, for example, the straight line connecting the midpoints of the two short sides and the straight line connecting the midpoints of the two long sides intersect with each other at the third center point CP3*f*. The third center point CP3*f* may be a center of the back main surface of the third sensor portion 14*f*, for example. At this time, when two diagonal lines are defined on the back main surface of the third sensor portion 14*f*, for example, the two diagonal lines intersect with each other at the third center point CP3*f*. When a straight line connecting midpoints of the two short sides and a straight line connecting midpoints of the two long sides are defined on the back main surface of the third sensor portion 14*f*, for example, the straight line connecting the midpoints of the two short sides and the straight line connecting the midpoints of the two long sides intersect with each other at the third center point CP3*f*.

Similarly, in the state that the sensor unit 10*f* is expanded in a plane, a fourth center point CP4*f* of the fourth sensor portion 15*f* is defined in a view in the front-back direction. The fourth center point CP4*f* is a center of gravity of the front main surface of the fourth sensor portion 15*f*, for example. The fourth center point CP4*f* may be a center of gravity of the back main surface of the fourth sensor portion 15*f*, for example. The fourth center point CP4*f* may be a center of the front main surface of the fourth sensor portion 15*f*, for example. At this time, when two diagonal lines are defined on the front main surface of the fourth sensor portion 15*f*, for example, the two diagonal lines intersect with each other at the fourth center point CP4*f*. When a straight line connecting midpoints of the two short sides and a straight line connecting midpoints of the two long sides are defined on the front main surface of the fourth sensor portion 15*f*, for example, the straight line connecting the midpoints of the two short sides and the straight line connecting the midpoints of the two long sides intersect with each other at the fourth center point CP4*f*. The fourth center point CP4*f* may be a center of the back main surface of the fourth sensor portion 15*f*, for example. At this time, when two diagonal lines are defined on the back main surface of the fourth sensor portion 15*f*, for example, the two diagonal lines intersect with each other at the fourth center point CP4*f*. When a straight line connecting midpoints of the two short sides and a straight line connecting midpoints of the two long sides are defined on the back main surface of the fourth sensor portion 15*f*, for example, the straight line connecting the midpoints of the two short sides and the straight line connecting the midpoints of the two long sides intersect with each other at the fourth center point CP4*f*.

As illustrated in FIG. 20, in the state that the sensor unit 10*f* is expanded in a plane, there is defined any straight line Li extending in the left-right direction in a view in the front-back direction. In the state that the sensor unit 10*f* is expanded in a plane, an intersection point of the straight line Li and a perpendicular line drawn from a first center point CP1*f* to the straight line Li, in a view in the front-back direction, is defined as a first intersection point P1*f*. An intersection point of the straight line Li and a perpendicular line drawn from the second center point CP2*f* to the straight line Li, in a view in the front-back direction, is defined as a second intersection point P2*f*. An intersection point of the straight line Li and a perpendicular line drawn from the third center point CP3*f* to the straight line Li, in a view in the front-back direction, is defined as a third intersection point P3*f*. An intersection point of the straight line Li and a perpendicular line drawn from the fourth center point CP4*f* to the straight line Li, in a view in the front-back direction, is defined as a fourth intersection point P4*f*. A distance between the first intersection point P1*f* and the second intersection point P2*f* is defined as a first distance D1*f*. A distance between the third intersection point P3*f* and the fourth intersection point P4*f* is defined as a second distance D2*f*. A distance between the first intersection point P1*f* and the third intersection point P3*f* is defined as a third distance D3*f*. A distance between the first intersection point P1*f* and the fourth intersection point P4*f* is defined as D4*f*. A distance between the second intersection point P2*f* and the third intersection point P3*f* is defined as D5*f*. A distance between the second intersection point P2*f* and the fourth intersection point P4*f* is defined as D6*f*.

In the state that the sensor unit 10*f* is expanded in a plane, the first distance D1*f* of the present embodiment is equal to one-half of the circumferential length of the sectional circle of the shaft 21*f* being the object to be measured. In the state that the sensor unit 10*f* is expanded in a plane, the second distance D2*f* of the present embodiment is equal to one-half of the circumferential length of the sectional circle of the shaft 21*f* being the object to be measured. In the state that the sensor unit 10*f* is expanded in a plane, the third distance D3*f* of the present embodiment is equal to one-fourth of the circumferential length of the sectional circle of the shaft 21*f* being the object to be measured. In the state that the sensor unit 10*f* is expanded in a plane, the fourth distance D4*f* of the present embodiment is equal to three-fourths of the circumferential length of the sectional circle of the shaft 21*f* being the object to be measured. In the state that the sensor unit 10*f* is expanded in a plane, the fifth distance D5*f* of the present embodiment is equal to one-fourth of the circumferential length of the sectional circle of the shaft 21*f* being the object to be measured. In the state that the sensor unit 10*f* is expanded in a plane, the sixth distance D6*f* of the present embodiment is equal to one-fourth of the circumferential length of the sectional circle of the shaft 21*f* being the object to be measured.

As illustrated in FIG. 23, the sensor unit 10*f* is attached to a circumferential surface of the shaft 21*f*. Specifically, the front main surface of the first sensor portion 12*f* and the front main surface of the second sensor portion 13*f* each are fixed to the shaft 21*f* by an adhesive layer (not illustrated) provided on the front main surface of the first sensor portion 12*f* and the front main surface of the second sensor portion 13*f*. In a state that the sensor unit 10*f* is attached to the shaft 21*f*, a direction in which each of the upper short side and the lower short side of the first sensor portion 12*f* extends, a direction in which each of the upper short side and the lower short side of the second sensor portion 13*f* extends, a direction in which each of the upper short side and the lower short side of the third sensor portion 14*f* extends, and a direction in which each of the upper short side and the lower short side of the fourth sensor portion 15*f* extends each are the same direction as the circumferential direction DIRC.

As illustrated in FIG. 24, in the state that the sensor unit 10*f* is attached to the shaft 21*f*, the first sensor portion 12*f* and the second sensor portion 13*f* are disposed between the shaft 21*f* and the third sensor portion 14*f*, and between the shaft 21*f* and the fourth sensor portion 15*f*. The first sensor portion 12*f* and the second sensor portion 13*f* each detect deformation of the shaft 21*f* in the third direction DIR3. The third sensor portion 14*f* and the fourth sensor portion 15*f* each detect deformation of the shaft 21*f* in the second direction DIR2.

In the state that the sensor unit 10*f* is attached to the shaft 21*f*, a left portion of the first sensor portion 12*f* overlaps a right portion of the fourth sensor portion 15*f* in a view in the third direction DIR3. A left long side of the front main surface of the first sensor portion 12*f* and a right long side of the front main surface of the second sensor portion 13*f* are in contact with each other. A left long side of the front main surface of the third sensor portion 14*f* and a right long side of the front main surface of the fourth sensor portion 15*f* are in contact with each other.

As described above, a direction in which each of the upper short side and the lower short side of the first sensor portion 12*f* extends, a direction in which each of the upper short side and the lower short side of the second sensor portion 13*f* extends, a direction in which each of the upper short side and the lower short side of the third sensor portion 14*f* extends, and a direction in which each of the upper short side and the lower short side of the fourth sensor portion 15*f* extends each are the same direction as the circumferential direction DIRC. Thus, the first distance D1*f* is equal to a distance in the circumferential direction DIRC between the first center point CP1*f* of the first sensor portion 12*f* and the second center point CP2*f* of the second sensor portion 13*f*. Similarly, the second distance D2*f* is equal to a distance in the circumferential direction DIRC between the third center point CP3*f* of the third sensor portion 14*f* and the fourth center point CP4*f* of the fourth sensor portion 15*f*. Similarly, the third distance D3*f* is equal to a distance in the circumferential direction DIRC between the first center point CP1*f* of the first sensor portion 12*f* and the third center point CP3*f* of the third sensor portion 14*f*. Similarly, the fourth distance D4*f* is equal to a distance in the circumferential direction DIRC between the first center point CP1*f* of the first sensor portion 12*f* and the fourth center point CP4*f* of the fourth sensor portion 15*f*. Similarly, the fifth distance D5*f* is equal to a distance in the circumferential direction DIRC between the second center point CP2*f* of the second sensor portion 13*f* and the third center point CP3*f* of the third sensor portion 14*f*. Similarly, the sixth distance D6*f* is equal to a distance in the circumferential direction DIRC between the second center point CP2*f* of the second sensor portion 13*f* and the fourth center point CP4*f* of the fourth sensor portion 15*f*.

As described above, in the state that the sensor unit 10*f* is expanded in a plane, the first distance D1*f* is equal to one-half of the circumferential length of the sectional circle of the shaft 21*f*. Thus, the first center point CP1*f* of the first sensor portion 12*f* and the second center point CP2*f* of the second sensor portion 13*f* are disposed to be separated from each other by 180 degrees in the circumferential direction DIRC of the shaft 21*f*. As described above, in the state that the sensor unit 10*f* is expanded in a plane, the second distance D2*f* is equal to one-half of the circumferential length of the sectional circle of the shaft 21*f*. Thus, the third center point CP3*f* of the third sensor portion 14*f* and the fourth center point CP4*f* of the fourth sensor portion 15*f* are disposed to be separated from each other by 180 degrees in the circumferential direction DIRC of the shaft 21*f*. As described above, in the state that the sensor unit 10*f* is expanded in a plane, the third distance D3*f* is equal to one-fourth of the circumferential length of the sectional circle of the shaft 21*f*. Thus, the first center point CP1*f* of the first sensor portion 12*f* and the third center point CP3*f* of the third sensor portion 14*f* are disposed to be separated from each other by 90 degrees in the circumferential direction DIRC of the shaft 21*f*. As described above, in the state that the sensor unit 10*f* is expanded in a plane, the fourth distance D4*f* is equal to three-fourths of the circumferential length of the sectional circle of the shaft 21*f*. Thus, the first center point CP1*f* of the first sensor portion 12*f* and the fourth center point CP4*f* of the fourth sensor portion 15*f* are disposed to be separated from each other by 90 degrees in the circumferential direction DIRC of the shaft 21*f*. As described above, in the state that the sensor unit 10*f* is expanded in a plane, the fifth distance D5*f* is equal to one-fourth of the circumferential length of the sectional circle of the shaft 21*f*. Thus, the second center point CP2*f* of the second sensor portion 13*f* and the third center point CP3*f* of the third sensor portion 14*f* are disposed to be separated from each other by 90 degrees in the circumferential direction DIRC of the shaft 21*f*. As described above, in the state that the sensor unit 10*f* is expanded in a plane, the sixth distance D6*f* is equal to one-fourth of the circumferential length of the sectional circle of the shaft 21*f*. Thus, the second center point CP2*f* of the second sensor portion 13*f* and the fourth center point CP4*f* of the fourth sensor portion 15*f* are disposed to be separated from each other by 90 degrees in the circumferential direction DIRC of the shaft 21*f*.

In the sensor unit 10*f* as described above as well, the same operational effects as those of the sensor unit 10 are achieved. Further, an area of each of the front main surface and the back main surface of each of the first sensor portion 12*f*, the second sensor portion 13*f*, the third sensor portion 14*f*, and the fourth sensor portion 15*f* may be enlarged. This makes it possible to enlarge an area for detecting electric charge of each of the first sensor portion 12*f*, the second sensor portion 13*f*, the third sensor portion 14*f*, and the fourth sensor portion 15*f*. Thus, output-voltage sensitivity of each of the first sensor portion 12*f*, the second sensor portion 13*f*, the third sensor portion 14*f*, and the fourth sensor portion 15*f* may be increased, and the detection accuracy of the sensor unit 10*f* may be increased.

When the shaft 21*f* is deformed in the second direction DIR2, the polarity of the electric charge generated by the piezoelectric film 143 and the polarity of the electric charge generated by the piezoelectric film 153 are equal to each other. This makes it possible to easily add a detection signal of the third sensor portion 14*f* and a detection signal of the fourth sensor portion 15*f*.

In the state that the sensor unit 10*f* is expanded in a plane, the uniaxial extension axis OD3 of the piezoelectric film 143 (third piezoelectric body) is not limited to have an angle of 45 degrees counterclockwise relative to the up-down direction, and may have another angle. Further, in the state that the sensor unit 10*f* is expanded in a plane, the uniaxial extension axis OD4 of the piezoelectric film 153 (fourth piezoelectric body) is not limited to have an angle of 45 degrees clockwise relative to the up-down direction, and may have another angle.

For example, in the state that the sensor unit 10*f* is expanded in a plane, the uniaxial extension axis OD3 of the piezoelectric film 143 (third piezoelectric body) may form an angle of 45 degrees clockwise relative to the up-down direction. Note that the angle of 45 degrees includes an angle of 45 degrees plus or minus approximately 10 degrees, for example. In the state that the sensor unit 10*f* is expanded in a plane, the uniaxial extension axis OD4 of the piezoelectric film 153 (fourth piezoelectric body) may form an angle of 45 degrees counterclockwise relative to the up-down direction. Note that the angle of 45 degrees includes an angle of 45 degrees plus or minus approximately 10 degrees, for example. In the configuration above as well, the same effects as those of the sensor unit 10*f* are achieved.

For example, in the state that the sensor unit 10*f* is expanded in a plane, each of the uniaxial extension axis OD3 of the piezoelectric film 143 (third piezoelectric body) and the uniaxial extension axis OD4 of the piezoelectric film 153 (fourth piezoelectric body) may form an angle of 0 degrees counterclockwise or 180 degrees counterclockwise relative to the up-down direction. Note that the angle of 0 degrees or the angle of 180 degrees includes an angle of 0 degrees plus or minus approximately 10 degrees or an angle of 180 degrees plus or minus approximately 10 degrees, for example. In the configuration above, it is possible to make a direction, in which the piezoelectric property of the piezoelectric film 143 (third piezoelectric body) is the highest, coincide with a direction of torsion relative to the up-down direction and the left-right direction. Further, it is possible to make a direction, in which the piezoelectric property of the piezoelectric film 153 (fourth piezoelectric body) is the highest, coincide with a direction of torsion relative to the up-down direction and the left-right direction.

For example, in the state that the sensor unit 10*f* is expanded in a plane, the uniaxial extension axis OD3 of the piezoelectric film 143 (third piezoelectric body) and the uniaxial extension axis OD4 of the piezoelectric film 153 (fourth piezoelectric body) may form an angle of 90 degrees counterclockwise or −90 degrees counterclockwise relative to the up-down direction. Note that the angle of 90 degrees or the angle of −90 degrees includes an angle of 90 degrees plus or minus approximately 10 degrees or an angle of −90 degrees plus or minus approximately 10 degrees, for example. In the configuration above, it is possible to make a direction, in which the piezoelectric property of the piezoelectric film 143 (third piezoelectric body) is the highest, coincide with a direction of torsion relative to the up-down direction and the left-right direction. Further, it is possible to make a direction, in which the piezoelectric property of the piezoelectric film 153 (fourth piezoelectric body) is the highest, coincide with a direction of torsion relative to the up-down direction and the left-right direction.

In the present embodiment, in the sensor unit 10*f*, each of the third sensor portion 14*f* and the fourth sensor portion 15*f* includes a film having PLA and extended in at least one axial direction. From a viewpoint of detecting deformation of an object to be measured, however, each of the third sensor portion 14*f* and the fourth sensor portion 15*f* may include a material including another piezoelectric body. Each of the third sensor portion 14*f* and the fourth sensor portion 15*f* may include a material having no piezoelectric property.

For example, each of the third sensor portion 14*f* and the fourth sensor portion 15*f* may have the d31 piezoelectric constant. Each of the third sensor portion 14*f* and the fourth sensor portion 15*f* having the d31 piezoelectric constant is a polyvinylidene fluoride (PVDF) film, for example.

The deformation detection of an object to be measured may be the detection of deformation amount itself.

For example, each of the third sensor portion 14*f* and the fourth sensor portion 15*f* may include a strain gauge.

The deformation detection of an object to be measured may be flexure detection of an object to be measured or torsion detection of an object to be measured.

The first electrode 144*a* may be provided on the front main surface S141. The second electrode 144*b* may be provided on the back main surface S142. The first electrode 154*a* may be provided on the front main surface S151. The second electrode 154*b* may be provided on the back main surface S152.

Note that one charge amplifier may be commonly used as the charge amplifier 145 and the charge amplifier 155. Similarly, one voltage amplification circuit may be commonly used as the voltage amplification circuit 146 and the voltage amplification circuit 156. Thus, it is possible to convert the sum of electric charge generated by the piezoelectric film 143 and electric charge generated by the piezoelectric film 153 into a detection signal being a voltage signal, amplify the detection signal, and output the detection signal.

In the state that the sensor unit 10*f* is expanded in a plane, it is sufficient that the front main surface of the third sensor portion 14*f* is disposed at a position overlapping the front main surface of the first sensor portion 12*f* or the front main surface of the second sensor portion 13*f* in a view in the front-back direction. That is, in the state that the sensor unit 10*f* is expanded in a plane, it is sufficient that the front main surface of the third sensor portion 14*f* has a portion overlapping the front main surface of the first sensor portion 12*f* or the front main surface of the second sensor portion 13*f* in a view in the front-back direction.

In the state that the sensor unit 10*f* is expanded in a plane, it is sufficient that the front main surface of the fourth sensor portion 15*f* is disposed at a position overlapping the front main surface of the first sensor portion 12*f* or the front main surface of the second sensor portion 13*f* in a view in the front-back direction. That is, in the state that the sensor unit 10*f* is expanded in a plane, it is sufficient that the front main surface of the fourth sensor portion 15*f* has a portion overlapping the front main surface of the first sensor portion 12*f* or the front main surface of the second sensor portion 13*f* in a view in the front-back direction.

In the state that the sensor unit 10*f* is expanded in a plane, each of the front main surface and the back main surface of the third sensor portion 14*f* may have a rectangular shape having short sides extending in the up-down direction and long sides extending in the left-right direction in a view in the front-back direction. Further, in the state that the sensor unit 10*f* is expanded in a plane, each of the front main surface and the back main surface of the fourth sensor portion 15*f* may have a rectangular shape having short sides extending in the up-down direction and long sides extending in the left-right direction in a view in the front-back direction.

In the state that the sensor unit 10*f* is expanded in a plane, the sum of a first length and a second length below may be longer than the circumferential length of the sectional circle of the shaft 21*f*. The first length is a length of the first sensor portion 12*f* in any one of the upper short side of the front main surface, the lower short side of the front main surface, the upper short side of the back main surface, and the lower short side of the back main surface. The second length is a length of the second sensor portion 13*f* in any one of the upper short side of the front main surface, the lower short side of the front main surface, the upper short side of the back main surface, and the lower short side of the back main surface. In the state that the sensor unit 10*f* is attached to the shaft 21*f*, in a view in the first direction DIR1, the sum of the number of first intersections and the number of second intersections below may be three or more. At the first intersection, any straight line orthogonal to the first direction DIR1 and the front main surface of the first sensor portion 12*f* intersect with each other, and at the second intersection, any straight line orthogonal to the first direction DIR1 and the front main surface of the second sensor portion 13*f* intersect with each other.

In the state that the sensor unit 10*f* is expanded in a plane, the sum of the length of the upper short side of the front main surface of the first sensor portion 12*f* and the length of the upper short side of the front main surface of the second sensor portion 13*f* may be equal to the circumferential length of the sectional circle of the shaft 21*f*.

In the state that the sensor unit 10*f* is expanded in a plane, the sum of the length of the upper short side of the front main surface of the first sensor portion 12*f* and the length of the upper short side of the front main surface of the second sensor portion 13*f* may be shorter than the circumferential length of the sectional circle of the shaft 21*f*.

In the state that the sensor unit 10*f* is expanded in a plane, the sum of the length of the upper short side of the front main surface of the third sensor portion 14*f* and the length of the upper short side of the front main surface of the fourth sensor portion 15*f* may be longer than the circumferential length of the sectional circle of the shaft 21*f*. In the state that the sensor unit 10*f* is attached to the shaft 21*f*, in a view in the first direction DIR1, the sum of the number of third intersections and the number of fourth intersections below may be three or more. At the third intersection, any straight line orthogonal to the first direction DIR1 and the front main surface of the third sensor portion 14*f* intersect with each other, and at the fourth intersection, any straight line orthogonal to the first direction DIR1 and the front main surface of the fourth sensor portion 15*f* intersect with each other.

In the state that the sensor unit 10*f* is expanded in a plane, the sum of the length of the upper short side of the front main surface of the third sensor portion 14*f*, and the length of the upper short side or the lower short side of the front main surface of the fourth sensor portion 15*f* may be equal to the circumferential length of the sectional circle of the shaft 21*f*.

In the state that the sensor unit 10*f* is expanded in a plane, the sum of the length of the upper short side of the front main surface of the third sensor portion 14*f*, and the length of the upper short side of the front main surface of the fourth sensor portion 15*f* may be shorter than the circumferential length of the sectional circle of the shaft 21*f*.

In the state that the sensor unit 10*f* is expanded in a plane, each of the front main surface and the back main surface of the third sensor portion 14*f* need not have a rectangular shape. For example, each of the front main surface and the back main surface of the third sensor portion 14*f* may have an elliptical shape or a square shape. In the state that the sensor unit 10*f* is expanded in a plane, each of the front main surface and the back main surface of the fourth sensor portion 15*f* need not have a rectangular shape. For example, each of the front main surface and the back main surface of the fourth sensor portion 15*f* may have an elliptical shape or a square shape.

In the state that the sensor unit 10*f* is expanded in a plane, the first distance D1*f* need not be equal to one-half of the circumferential length of the sectional circle of the shaft 21*f*. For example, in the state that the sensor unit 10*f* is expanded in a plane, in a case that the first distance D1*f* is equal to one-sixth of the circumferential length of the sectional circle of the shaft 21*f*, the first center point CP1*f* of the first sensor portion 12*f* and the second center point CP2*f* of the second sensor portion 13*f* are disposed to be separated from each other by 60 degrees in the circumferential direction DIRC of the shaft 21*f* in the state that the sensor unit 10*f* is attached to the shaft 21*f*.

In the state that the sensor unit 10*f* is expanded in a plane, the second distance D2*f* need not be equal to one-half of the circumferential length of the sectional circle of the shaft 21*f*. For example, in the state that the sensor unit 10*f* is expanded in a plane, in a case that the second distance D2*f* is equal to one-sixth of the circumferential length of the sectional circle of the shaft 21*f*, the third center point CP3*f* of the third sensor portion 14*f* and the fourth center point CP4*f* of the fourth sensor portion 15*f* are disposed to be separated from each other by 60 degrees in the circumferential direction DIRC of the shaft 21*f* in the state that the sensor unit 10*f* is attached to the shaft 21*f*.

In the state that the sensor unit 10*f* is expanded in a plane, the third distance D3*f* need not be equal to one-fourth of the circumferential length of the sectional circle of the shaft 21*f*. For example, in the state that the sensor unit 10*f* is expanded in a plane, in a case that the third distance D3*f* is equal to one-sixth of the circumferential length of the sectional circle of the shaft 21*f*, the first center point CP1*f* of the first sensor portion 12*f* and the third center point CP3*f* of the third sensor portion 14*f* are disposed to be separated from each other by 60 degrees in the circumferential direction DIRC of the shaft 21*f* in the state that the sensor unit 10*f* is attached to the shaft 21*f*.

In the state that the sensor unit 10*f* is expanded in a plane, the fourth distance D4*f* need not be equal to three-fourths of the circumferential length of the sectional circle of the shaft 21*f*. For example, in the state that the sensor unit 10*f* is expanded in a plane, in a case that the fourth distance D4*f* is equal to one-sixth of the circumferential length of the sectional circle of the shaft 21*f*, the first center point CP1*f* of the first sensor portion 12*f* and the fourth center point CP4*f* of the fourth sensor portion 15*f* are disposed to be separated from each other by 60 degrees in the circumferential direction DIRC of the shaft 21*f* in the state that the sensor unit 10*f* is attached to the shaft 21*f*.

In the state that the sensor unit 10*f* is expanded in a plane, the fifth distance D5*f* need not be equal to one-fourth of the circumferential length of the sectional circle of the shaft 21*f*. For example, in the state that the sensor unit 10*f* is expanded in a plane, in a case that the fifth distance D5*f* is equal to one-sixth of the circumferential length of the sectional circle of the shaft 21*f*, the second center point CP2*f* of the second sensor portion 13*f* and the third center point CP3*f* of the third sensor portion 14*f* are disposed to be separated from each other by 60 degrees in the circumferential direction DIRC of the shaft 21*f* in the state that the sensor unit 10*f* is attached to the shaft 21*f*.

In the state that the sensor unit 10*f* is expanded in a plane, the sixth distance D6*f* need not be equal to one-fourth of the circumferential length of the sectional circle of the shaft 21*f*. For example, in the state that the sensor unit 10*f* is expanded in a plane, in a case that the sixth distance D6*f* is equal to one-sixth of the circumferential length of the sectional circle of the shaft 21*f*, the second center point CP2*f* of the second sensor portion 13*f* and the fourth center point CP4*f* of the fourth sensor portion 15*f* are disposed to be separated from each other by 60 degrees in the circumferential direction DIRC of the shaft 21*f* in the state that the sensor unit 10*f* is attached to the shaft 21*f*.

The third sensor portion 14*f* and the fourth sensor portion 15*f* may be disposed between the shaft 21*f* and the first sensor portion 12*f*, and between the shaft 21*f* and the second sensor portion 13*f*.

In the state that the sensor unit 10*f* is expanded in a plane, positions in the up-down direction of the first center point CP1*f* of the first sensor portion 12*f*, the second center point CP2*f* of the second sensor portion 13*f*, the third center point CP3*f* of the third sensor portion 14*f*, and the fourth center point CP4*f* of the fourth sensor portion 15*f* may be different from each other.

In the state that the sensor unit 10*f* is expanded in a plane, the first sensor portion 12*f*, the second sensor portion 13*f*, the third sensor portion 14*f*, and the fourth sensor portion 15*f* may be arranged side by side in the up-down direction.

In the state that the sensor unit 10*f* is expanded in a plane, the back main surface of the third sensor portion 14*f* may have a portion not overlapping the back main surface of the fourth sensor portion 15*f* in a view in the front-back direction.

In the state that the sensor unit 10*f* is expanded in a plane, the front main surface of the first sensor portion 12*f* or the front main surface of the second sensor portion 13*f* may have a portion not overlapping the front main surface of the third sensor portion 14*f* or the front main surface of the fourth sensor portion 15*f* in a view in the front-back direction.

Part of an outer edge of the front main surface of the third sensor portion 14*f* and part of an outer edge of the front main surface of the fourth sensor portion 15*f* may be in contact with each other via an adhesive layer having an insulation property.

Part of an outer edge of the back main surface of the third sensor portion 14*f* and part of an outer edge of the back main surface of the fourth sensor portion 15*f* may be in contact with each other. Part of the outer edge of the back main surface of the third sensor portion 14*f* and part of the outer edge of the back main surface of the fourth sensor portion 15*f* may be in contact with each other via an adhesive layer having an insulation property.

It is acceptable that the fourth sensor portion 15*f* is not provided.

OTHER EMBODIMENTS

The sensor unit according to the present disclosure is not limited to the sensor unit 10 and 10*a* to 10*f*, and can be changed within the scope of the gist thereof. Further, any combination of the configurations of the sensor unit 10 and 10*a* to 10*f* is acceptable.

10, 10*a*, 10*b*, 10*c*, 10*d*, 10*e*, 10*f* SENSOR UNIT
11, 11*a*, 11*b*, 11*c*, 11*d*, 11*e* SHEET
12, 12*a*, 12*b*, 12*c*, 12*d*, 12*e*, 12*f* FIRST SENSOR PORTION
13, 13*a*, 13*b*, 13*c*, 13*d*, 13*e*, 13*f* SECOND SENSOR PORTION
14*f* THIRD SENSOR PORTION
15*f* FOURTH SENSOR PORTION
20, 20*a*, 20*b*, 20*c*, 20*d*, 20*e*, 20*f* GOLF CLUB
21, 21*a*, 21*b*, 21*c*, 21*d*, 21*e*, 21*f* SHAFT
22 HEAD
123, 133, 143, 153 PIEZOELECTRIC FILM
124*a*, 134*a*, 144*a*, 154*a* FIRST ELECTRODE
124*b*, 134*b*, 144*b*, 154*b* SECOND ELECTRODE
125, 135, 145, 155 CHARGE AMPLIFIER
126, 136, 146, 156 VOLTAGE AMPLIFICATION CIRCUIT
OD1, OD2, OD3, OD4 UNIAXIAL EXTENSION AXIS
S121, S131, S141, S151 FRONT MAIN SURFACE
S122, S132, S142, S152 BACK MAIN SURFACE
CP1, CP1*b*, CP1*c*, CP1*f* FIRST CENTER POINT
CP2, CP2*b*, CP2*c*, CP2*f* SECOND CENTER POINT
CP3*f* THIRD CENTER POINT
CP4*f* FOURTH CENTER POINT
D1, D1*c*, D1*f* FIRST DISTANCE
D2*f* SECOND DISTANCE
D3*f* THIRD DISTANCE
D4*f* FOURTH DISTANCE
D5*f* FIFTH DISTANCE
D6*f* SIXTH DISTANCE

The invention claimed is:

1. A sensor unit for detecting deformation of an object to be measured, the sensor unit comprising:
a first sensor portion configured to detect deformation of the object and having a film shape;
a second sensor portion configured to detect deformation of the object and having a film shape; and
a sheet attached to the object,
wherein a main surface of the first sensor portion and a main surface of the second sensor portion are attached to the sheet, and
wherein the main surfaces of the first sensor portion and the second sensor portion do not fully overlap each other in a planar plan view of the sheet along a direction normal to the main surface of the sheet, such that the main surface of the first sensor portion has a nonoverlapping region that does not overlap the main surface of the second sensor portion, and the main surface of the second sensor portion has a nonoverlapping region that does not overlap the main surface of the first sensor portion.

2. The sensor unit according to claim 1, wherein the first sensor portion and the second sensor portion are disposed between the object when the sensor unit is attached to the object.

3. The sensor unit according to claim 1, wherein the sheet is disposed between the object and the first sensor portion and between the object and the second sensor portion when the sensor unit is attached to the object.

4. The sensor unit according to claim 1,
wherein a shape of the object extends in a first direction,
wherein a rotating direction around the first direction is a circumferential direction, and
wherein a length of the main surface of the sheet in the circumferential direction is shorter than a length of the object in the circumferential direction.

5. The sensor unit according to claim 4, wherein the main surface of the first sensor portion has a second nonoverlapping region that does not overlap the main surface of the sheet in the planar plan view of the sheet.

6. The sensor unit according to claim 4, wherein the main surface of the second sensor portion has a second nonoverlapping region that does not overlap the main surface of the sheet in the planar plan view of the sheet.

7. The sensor unit according to claim 1, wherein the sheet is an insulator.

8. The sensor unit according to claim 1, wherein part of an outer edge of the main surface of the first sensor portion and part of an outer edge of the main surface of the second sensor portion are in contact with each other.

9. The sensor unit according to claim 1,
wherein the main surface of the first sensor portion has an overlapping region that overlaps the main surface of the second sensor portion in the planar plan view, and wherein the main surface of the second sensor portion has an overlapping region that overlaps the main surface of the first sensor portion in the planar plan view.

10. The sensor unit according to claim 1, wherein a distance between a first center point of the first sensor portion and a second center point of the second sensor portion is one-fourth or three-fourths of a length of the object in a circumferential direction in the planar plan view, the circumferential direction being a rotating direction around an extension direction of the object.

11. The sensor unit according to claim 1, wherein the first sensor portion comprises a first piezoelectric body, wherein the first piezoelectric body is a film comprising polylactic acid and extends in at least one axial direction, wherein a main surface of the first piezoelectric body has a rectangular shape in the planar plan view of the sheet, wherein the second sensor portion comprises a second piezoelectric body, wherein the second piezoelectric body is a film comprising polylactic acid and extends in at least one axial direction, and wherein a main surface of the second piezoelectric body has a rectangular shape in the planar plan view.

12. The sensor unit according to claim 11, wherein an extension axis of the first piezoelectric body forms an angle of 0 degrees, 180 degrees, 45 degrees, −45 degrees, 90 degrees, or −90 degrees relative to a longitudinal direction of the first piezoelectric body in the planar plan view.

13. The sensor unit according to claim 11, wherein an extension axis of the second piezoelectric body forms an angle of 0 degrees, 180 degrees, 45 degrees, −45 degrees, 90 degrees, or −90 degrees relative to a longitudinal direction of the second piezoelectric body in the planar plan view.

14. The sensor unit according to claim 1, wherein the sheet is a third sensor portion configured to detect deformation of the object and has a film shape.

15. The sensor unit according to claim 14, further comprising:

a fourth sensor portion configured to detect deformation of the object and having a film shape, wherein a main surface of the third sensor portion has a nonoverlapping region that does not overlap a main surface of the fourth sensor portion, and an overlapping region that overlaps the main surface of the first sensor portion or the main surface of the second sensor portion in the planar plan view, wherein the main surface of the fourth sensor portion has a nonoverlapping region that does not overlap the main surface of the third sensor portion and an overlapping region that overlaps the main surface of the first sensor portion or the main surface of the second sensor portion in the planar plan view, wherein part of an outer edge of the main surface of the third sensor portion and part of an outer edge of the main surface of the fourth sensor portion are in contact with each other, wherein in the planar plan view a distance between a first center point of the first sensor portion and a second center point of the second sensor portion is one-half of a length of the object measured in a circumferential direction, the circumferential direction being a rotating direction around an extension direction of the object, wherein in the planar plan view a distance between a third center point of the third sensor portion and a fourth center point of the fourth sensor portion is one-half of the length of the object in the circumferential direction, and wherein in the planar plan view a distance between the first center point of the first sensor portion or the second center point of the second sensor portion and the third center point of the third sensor portion or the fourth center point of the fourth sensor portion is one-fourth or three-fourths of the length of the object in the circumferential direction.

16. The sensor unit according to claim 15, wherein the fourth sensor portion comprises a fourth piezoelectric body, the fourth piezoelectric body is a film comprising polylactic acid and extends in at least one axial direction, and wherein a main surface of the fourth piezoelectric body has a rectangular shape in the planar plan view.

17. The sensor unit according to claim 16, an extension axis of a third piezoelectric body forms an angle of 45 degrees counterclockwise relative to a longitudinal direction of the third piezoelectric body in the planar plan view, and wherein an extension axis of the fourth piezoelectric body forms an angle of −45 degrees counterclockwise relative to a longitudinal direction of the fourth piezoelectric body in the planar plan view.

18. The sensor unit according to claim 14, wherein the third sensor portion comprises a third piezoelectric body, wherein the third piezoelectric body is a film comprising polylactic acid and extends in at least one axial direction, and wherein a main surface of the third piezoelectric body has a rectangular shape in the planar plan view.

19. The sensor unit according to claim 1, wherein the main surface of the first sensor portion does not overlap the main surface of the second sensor portion in the planar plan view, and wherein the main surface of the second sensor portion does not overlap the main surface of the first sensor portion in the planar plan view.

20. The sensor unit according to claim 1, wherein a long side or a long axis of the main surface of the first sensor portion is parallel to a long side or a long axis of the main surface of the second sensor portion in the planar plan view.

* * * * *